United States Patent [19]

Sugiyama et al.

[11] 4,102,688
[45] Jul. 25, 1978

[54] METHINE DYES

[75] Inventors: Masatoshi Sugiyama; Hirosi Sawaguchi; Akio Mitsui, all of Kanagawa, Japan

[73] Assignee: Fuji Photo Film Co., Ltd., Minami Ashigara, Japan

[21] Appl. No.: 795,041

[22] Filed: May 9, 1977

[30] Foreign Application Priority Data

May 10, 1976 [JP] Japan .................................. 51-52994

[51] Int. Cl.² .......................... G03C 1/14; G03C 1/22
[52] U.S. Cl. ...................................... 96/139; 96/141; 260/296 B; 260/296 H; 542/436; 542/444; 542/437
[58] Field of Search ................ 542/436, 432, 444, 437; 260/296 H, 296 B; 96/139, 141

[56] References Cited

U.S. PATENT DOCUMENTS 3,809,691  5/1974  Carpenter et al. ............... 260/296 H
3,865,817  2/1975  Kobayashi et al. ................... 542/444
3,933,798  1/1976  Curtis et al. ........................... 542/444

OTHER PUBLICATIONS

Imbach et al., Bull. Soc. Chim. France, 1970, pp. 1929–1935.

Primary Examiner—Arthur P. Demers
Attorney, Agent, or Firm—Sughrue, Rothwell, Mion, Zinn and Macpeak

[57] ABSTRACT

Methine dyes represented by the following general formulae (A), (B) or (C):

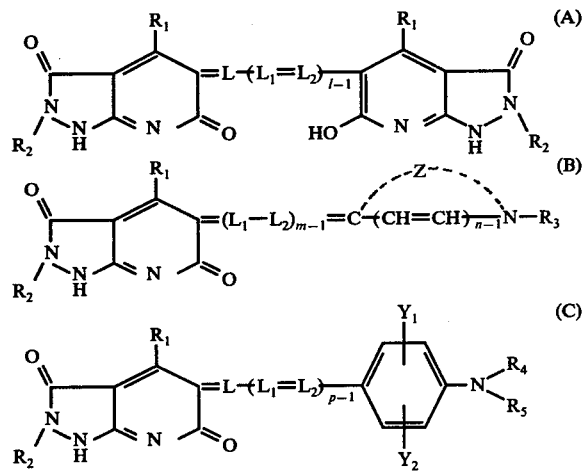

wherein $R_1$ represents an alkyl group (which may be substituted), an aralkyl group (which may be substituted), an aryl group (which may be substituted), a 5- or 6-membered heterocyclic residue, a carboxyl group, an alkoxycarbonyl group, an aryloxycarbonyl group or an amino group (which may be substituted); $R_2$, $R_3$, $R_4$ and $R_5$, which may be the same or different, each represents an alkyl group (which may be substituted), an aralkyl group (which may be substituted), an aryl group (which may be substituted) or a 5- or 6-membered heterocyclic residue, with $R_2$ additionally representing a hydrogen atom; Z represents an atomic group necessary to form a heterocyclic nucleus containing a 5- or 6-membered hetero ring; $Y_1$ and $Y_2$, which may be the same or different, each represents a hydrogen atom, an alkyl group (which may be substituted), a hydroxyl group, an alkoxy group, an amino group (which may be substituted) or a sulfo group; L, $L_1$ and $L_2$ each represents a methine group (which may be substituted); $l$, $n$ and $p$ each represents 1 or 2 and m represents 1, 2 or 3.

24 Claims, 1 Drawing Figure

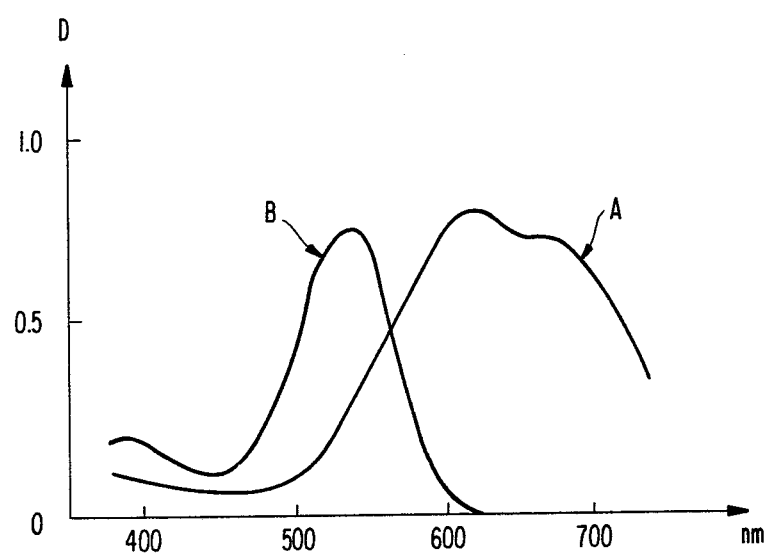

METHINE DYES

BACKGROUND OF THE INVENTION

1. Field of the Invention

The present invention relates to novel methine dyes and particularly to methine dyes having a pyrazolopyridine nucleus.

2. Description of the Prior Art

Hitherto, water-soluble dyes having a pyrazolin-5-one nucleus have been widely used for photographic sensitive materials because they have excellent absorption characteristics, good compatibility with photographic emulsions and good decoloration properties by sulfites, etc. Namely, they have been widely used as dyes for a filter layer, an antihalation layer or emulsion layers. These kinds of dyes are described in, for example, U.S. Pat. Nos. 2,274,782, 2,527,783, 3,627,532, 3,647,460 and 3,865,817, etc.

However, the wavelengths of light absorbed by dyes having a pyrazolone nucleus are limited even though they have a long methine chain. The dyes which absorb light of a long wavelength are unstable in solution and consequently they are difficult to purify.

SUMMARY OF THE INVENTION

A first object of the present invention is to provide dyes having absorption wavelengths which could not be obtained in prior oxonol dyes, hexmioxonol dyes and merocyanine dyes having a pyrazolin-5-one nucleus.

A second object of the present invention is to provide dyes which absorb light at long wavelengths and which are stable in solution.

A third object of the present invention is to provide dyes useful for silver halide light-sensitive materials which are easily and irreversibly decolored in photographic processing solutions containing sulfites and do not cause desensitization or fogging which is undesirable for silver halide photographic emulsions.

Accordingly the methine dyes of the present invention are represented by the following general formulae (A), (B) and (C).

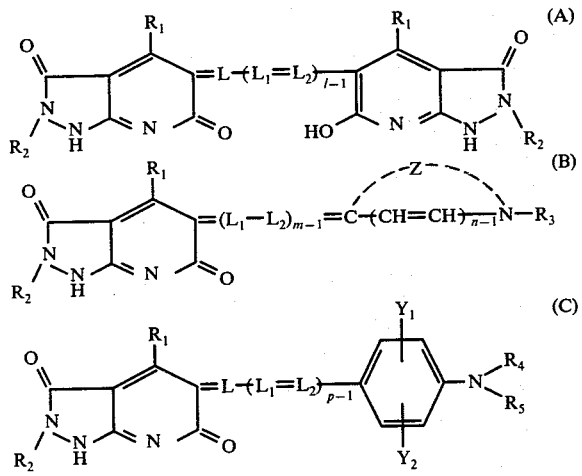

wherein $R_1$ represents an alkyl group (which may be substituted), an aralkyl group (which may be substituted), an aryl group (which may be substituted), a 5- or 6-membered heterocyclic residue, a carboxyl group, an alkoxycarbonyl group, an aryloxycarbonyl group or an amino group (which may be substituted); $R_2$, $R_3$, $R_4$ and $R_5$, which may be the same or different, each represents an alkyl group (which may be substituted), an aralkyl group (which may be substituted), an aryl group (which may be substituted) or a 5- or 6-membered heterocyclic residue, and $R_2$ may additionally represent a hydrogen atom; Z represents an atomic group necessary to form a heterocyclic nucleus containing a 5- or 6-membered hetero ring; $Y_1$ and $Y_2$, which may be the same or different, each represents a hydrogen atom, an alkyl group (which may be substituted), a hydroxyl group, an alkoxy group, an amino group (which may be substituted) or a sulfo group; L, $L_1$ and $L_2$ each represents a methine group (which may be substituted); $l$, $n$ and $p$ each represents 1 or 2 and $m$ represents 1, 2 or 3.

BRIEF DESCRIPTION OF THE DRAWING

The FIGURE shows the spectral absorption characteristics of gelatin layers containing a dye, wherein Curve A is that of Dye 8 of the present invention and Curve B is that of the known Dye (C).

DETAILED DESCRIPTION OF THE INVENTION

In the formulae, $R_2$, $R_3$, $R_4$ and $R_5$ may be the same or different and each represents an alkyl group having 18 or less carbon atoms (for example, an alkyl group which is unsubstituted and also a substituted alkyl group, which may be substituted with one or more of, for example, a sulfo group, a carboxyl group, a hydroxyl group, an alkoxy group, an alkoxycarbonyl group, a cyano group, a halogen atom, an acyl group, an acyloxy group or a vinyl group, etc.), a monocyclic or bicyclic aryl group (for example, an unsubstituted aryl group or an aryl group substituted with one or more of, for example, a sulfo group, a carboxyl group, an alkyl group, a hydroxyl group, an alkoxy group, an aryloxy group, a halogen atom, a nitro group or an amino group, etc.), an aralkyl group having 7 to 10 carbon atoms (in which the aryl moiety thereof may be unsubstituted or substituted with one or more of the same substituents as set forth for the above-described aryl group) or a 5- or 6-membered heterocyclic residue (for example, containing one or more of nitrogen, oxygen, sulfur and selenium atoms as hetero atoms such as a thiazole, oxazole, selenazole or pyridine type residue, etc., which ring may be substituted). $R_2$ may additionally represent a hydrogen atom.

$R_1$ represents a carboxyl group, an alkoxycarbonyl group having 1 to 18 carbon atoms in the alkyl moiety thereof in which the alkyl moiety may be substituted with one or more of a methyl group, a sulfomethyl group, an ethoxycarbonylmethyl group, a β-sulfoethyl group, a β-chloroethyl group, a β-cyanoethyl group, an α-bromo-α-methyl ethyl group, a benzyl group and the like, an aryloxycarbonyl group (in which the aryl moiety may be substituted e.g., a p-sulfophenyl group, an m,m-disulfophenyl group, an m-sulfophenyl group, etc.), an amino group (for example, an unsubstituted amino group or a substituted amino group) and the same groups as described above for $R_3$, namely, an alkyl group, an aryl group, an aralkyl group or a heterocyclic residue.

Z represents an atomic group necessary to form a 5- or 6-membered heterocyclic ring or a condensed heterocyclic ring containing 5- or 6-membered heterocyclic ring (e.g., containing one or more of nitrogen, oxygen, sulfur and selenium atoms as hetero atoms which ring may be substituted), which are generally used in cyanine dyes. Examples of suitable heterocyclic groups formed by Z include thiazoles (for example, thiazole, 4-methylthiazole, 5-methylthiazole, 4-phenylthiazole, 5-phenylthiazole, 4,5-diphenylthiazole, benzothiazole, 5-chlorobenzothiazole, 6-chlorobenzothiazole, 5-methylbenzothiazole, 6-methylbenzothiazole, 5-bromobenzothiazole, 5-methoxybenzothiazole, 5-hydroxybenzothiazole, α-naphthothiazole, β-naphthothiazole, 5-methoxy-β-naphthothiazole or 8-methoxy-α-naphthothiazole, etc.), oxazoles (for example, 4-methyloxazole, 5-methyloxazole, 4-phenyloxazole, 5-phenyloxazole, 4,5-diphenyloxazole, 4-ethyloxazole, benzoxazole, 5-chlorobenzoxazole, 5-methylbenzoxazole, 5-phenylbenzoxazole, 5-methoxybenzoxazole, 5-ethoxycarbonylbenzoxazole, 5-cyanobenzoxazole, 5-trifluoromethylbenzoxazole, α-naphthoxazole or β-naphthoxazole, etc.), selenazoles (benzoselenazole, 5-chlorobenzoselenazole, 5-methylbenzoselenazole or 6-methoxybenzoselenazole, etc.), pyridines (2-pyridine, 5-methyl-2-pyridine or 4-pyridine, etc.), quinolines (2-quinoline, 6-methoxy-2-quinoline, 6-chloro-2-quinoline, 4-quinoline, 6-methoxy-4-quinoline, 7-methyl-4-quinoline, 1-isoquinoline or 3-isoquinoline, etc.) and tetrazoles (5-tetrazole, etc.), etc.

$Y_1$ and $Y_2$ may be the same or different and each represents a hydrogen atom, an alkyl group (having 1 to 4 carbon atoms), a hydroxyl group, a sulfo group, an alkoxy group (having 1 to 4 carbon atoms) or an amino group (which may be substituted (e.g., a methylamino group, an acetamido group, etc.).

L, $L_1$ and $L_2$ each represents a methine group (for example, an unsubstituted or substituted methine group). $l$, $n$ and $p$ each represents 1 or 2, and $m$ represents 1, 2 or 3.

Examples of suitable alkyl groups represented by $R_1$, $R_2$, $R_3$, $R_4$ or $R_5$ include unsubstituted alkyl groups having 1 to 18 carbon atoms which may contain a ring, such as a methyl group, an ethyl group, an isopropyl group, a t-butyl group, an octyl group, a heptadecyl group, a cyclohexyl group, a cyclohexylmethyl group, etc.; and substituted alkyl groups in which the alkyl moiety has 1 to 6 carbon atoms, such as a sulfoalkyl group (for example, a 2-sulfoethyl group, a 3-sulfopropyl group, a 3-sulfobutyl group, a 4-sulfobutyl group, etc.), a carboxyalkyl group (for example, a carboxymethyl group, a 2-carboxyethyl group, a 4-carboxybutyl group, etc.), a haloalkyl group (for example, a 2-chloroethyl group, a chloromethyl group, a 2-bromoethyl group, etc.), a cyanoalkyl group (for example, a 2-cyanoethyl group, etc.), a hydroxyalkyl group (for example, a monohydroxyalkyl group such as a 2-hydroxyethyl group, etc., a dihydroxyalkyl group, such as a 2,3-dihydroxypropyl group, etc., etc.), a halohydroxyalkyl group (for example, a 2-chloro-3-hydroxypropyl group, etc.), an alkoxyalkyl group in which the alkoxy moiety has 1 to 12 carbon atoms (for example, an ethoxycarbonylmethyl group, etc.), an alkoxycarbonyloxyalkyl group in which the alkoxy moiety has 1 to 12 carbon atoms (for example, a 2-ethoxycarbonyloxyethyl group, etc.), an acylalkyl group having an alkylcarbonyl moiety with 2 to 6 carbon atoms (for example, an acetylmethyl group, etc.), an acyloxyalkyl group having an alkylcarbonyl moiety with 2 to 6 carbon atoms (for example, an acetoxyethyl group, etc.), an aminoalkyl group (in which the amino group may be substituted, such as a dialkylaminoalkyl group, an N-alkyl-anilinoalkyl group, an acetylaminoalkyl group or an alkylsulfonylaminoalkyl group in which the alkyl moiety has 1 to 6 carbon atoms, etc.), an alkylthioalkyl group or an alkylsulfonyloxyalkyl group in which the alkyl moiety has 1 to 6 carbon atoms (for example, a 2-methylthioethyl group, a 2-methylsulfonyloxyethyl group, etc.) and an aryloxyalkyl group (in which the aryl moiety may be substituted, e.g., with a halogen atom or alkyl group (e.g., a methyl group), etc.

Examples of aralkyl groups represented by $R_1$, $R_2$, $R_3$, $R_4$ and $R_5$ have an aryl moiety which may be substituted, and examples of which include a benzyl group, a phenethyl group, a p-methoxy group, a p-sulfobenzyl group, a p-sulfophenylethyl group, a p-methylphenylethyl group, etc.).

Examples of suitable aryl groups represented by $R_1$, $R_2$, $R_3$, $R_4$ and $R_5$ include unsubstituted aryl groups (for example, a phenyl group, a α-naphthyl group, a β-naphthyl group, etc.) and substituted aryl groups such as phenyl groups substituted with one or more of alkyl or alkoxy groups having 1 to 4 carbon atoms, hydroxyl groups, carboxyl groups, sulfo groups, halogen atoms (for example, a chlorine atom, etc.), etc.

Examples of suitable heterocyclic groups (e.g., containing one or more of nitrogen, oxygen and sulfur atoms as hetero atoms) represented by $R_1$, $R_2$, $R_3$, $R_4$ and $R_5$ include pyridyl groups (a 4-pyridyl group, a 2-pyridyl group, a 5-sulfo-2-pyridyl group, a 4-methyl-2-pyridyl group, etc.), quinolinyl groups (a 2-quinolinyl group, a 4-quinolinyl group, etc.), benzoxazolyl groups (a benzoxazolyl group, a 6-sulfobenzoxazolyl group, a 5-methylbenzoxazolyl group, etc.), thiazolyl groups (for example, a 4-methyl-5-ethoxycarbonylthiazolyl group, etc.), oxazolyl, selenazolyl and benzothiazolyl groups (a 6-sulfobenzothiazolyl group, a 2-benzothiazolyl group or a 6-sulfo-7-methylbenzothiazolyl group, etc.), etc.

Examples of preferred groups for $R_1$ include unsubstituted alkyl groups having 1 to 8 carbon atoms, sulfoalkyl groups (for example, a 2-sulfoethyl group or a 3-sulfopropyl group), alkoxycarbonylalkyl groups having a total of 3 to 6 carbon atoms (for example, an ethoxycarbonyl methyl group), haloalkyl groups (for example, a chloromethyl group or a 2-chloroethyl group), a benzyl group, a phenethyl group, a p-sulfobenzyl group, a phenyl group, a naphthyl group, sulfo-substituted phenyl groups (for example, a 3-sulfophenyl group, a 3,5-disulfophenyl group, a 4-chloro-3-sulfophenyl group or a 6-methoxy-3-sulfophenyl group, etc.), a carboxyl group, alkoxycarbonyl groups having a total of 2 to 5 carbon atoms (for example, an ethoxycarbonyl group or a butoxycarbonyl group, etc.), unsubstituted amino groups or substituted amino groups such as alkylamino groups (a methylamino group, an ethylamino group, a butylamino group, a 2-hydroxyethylamino group, a 2-chloroethylamino group, a 2-sulfoethylamino group, a 3-sulfopropylamino group or a dimethylamino group, etc.), arylamino groups (an anilino group, etc.), acylamino groups (an acetamido group, a propionamido group, a benzamido group or a methoxybenzamido group, etc.), carbamoyl groups (a carbamoyl group, a methylcarbamoyl group, an ethylcarbamoyl group or a phenylcarbamoyl group, etc.) and ureido groups (a ureido group, a methylureido group, an ethylureido group, or a phenylureido group, etc.).

Examples of preferred groups for $R_2$ include alkyl groups having 1 to 8 carbon atoms, sulfoalkyl groups having 1 to 6 carbon atoms, carboxyalkyl groups having a total of 1 to 6 carbon atoms, aralkyl groups (for example, a benzyl group or a p-sulfobenzyl group), aryl groups (for example, a phenyl group, an α-naphthyl group or a β-naphthyl group), sulfo-substituted aryl groups (for example, a 4-sulfophenyl group, a 2,5-disulfophenyl group or a 3,5-disulfophenyl group, etc.) and halogen substituted aryl groups (for example, a 2,5-dichlorophenyl group or a 2,4,6-trichlorophenyl group).

Examples of preferred groups for $R_3$ include unsubstituted alkyl groups having 1 to 18 carbon atoms (for example, a methyl group, an ethyl group, a propyl group, a butyl group, a hexyl group, a cyclohexyl group or a dodecyl group, etc.) and substituted alkyl groups in which the alkyl moiety has 1 to 6 carbon atoms, such as sulfoalkyl groups (a 3-sulfobutyl group, a 2-sulfoethyl group, a 3-sulfopropyl group, a 4-sulfobutyl group, a 3-sulfo-2-methyl-propyl group or a 3-sulfo-2,2-dimethyl-propyl group, etc.), carboxyalkyl groups (a 2-carboxyethyl group, a 3-carboxypropyl group or a 4-carboxybutyl group, etc.), hydroxyalkyl groups (a 2-hydroxyethyl group or a 4-hydroxybutyl group, etc.), alkoxyalkyl groups in which the alkoxy moiety has 1 to 8 carbon atoms (a 2-methoxyethyl group or a 4-butoxybutyl group, etc.), acyloxyalkyl groups in which the acyloxy moiety has 2 to 8 carbon atoms (a 2-acetoxyethyl group, a 3-acetoxypropyl group or a 4-butyryloxybutyl group, etc.), alkoxycarbonylalkyl groups (a 2-methoxycarbonylethyl group or a 4-ethoxycarbonylbutyl group, etc.), alkenyl groups (an allyl group, a 1-propenyl group or a 2-butenyl group, etc.) and aralkyl groups (a benzyl group or a phenylethyl group, etc.), etc.

Examples of preferred groups for $R_4$ and $R_5$ include a hydrogen atom, unsubstituted alkyl groups having 1 to 18 carbon atoms (a methyl group, an ethyl group, a propyl group, a t-butyl group, a dodecyl group or a heptadecyl group, etc.) and substituted alkyl groups in which the alkyl moiety has 1 to 6 carbon atoms, such as sulfoalkyl groups (for example, a 2-sulfoethyl group, a 3-sulfopropyl group or a 4-sulfobutyl group, etc.), carboxyalkyl groups (a 2-carboxyethyl group, a 3-carboxypropyl group or a 4-carboxybutyl group, etc.), hydroxyalkyl groups (a 2-hydroxyethyl group or a 4-hydroxybutyl group, etc.), haloalkyl groups (a 2-chloroethyl group, a 3-chloropropyl group, a 2-bromoethyl group or a 3-bromopropyl group, etc.), cyanoalkyl groups (a 2-cyanoethyl group or a 3-cyanopropyl group, etc.), sulfonylaminoalkyl groups (for example, a methylsulfonylaminoethyl group), alkoxyalkyl groups having a total of 2 to 8 carbon atoms (a 2-methoxyethyl group or a 4-butoxybutyl group, etc.), acyloxyalkyl groups having a total of 3 to 8 carbon atoms (a 2-acetoxyethyl group, a 3-acetoxypropyl group or a 4-butyryloxybutyl group, etc.), alkoxycarbonylalkyl groups having a total of 3 to 8 carbon atoms (an ethoxycarbonylmethyl group, a 2-methoxycarbonylethyl group or a 4-ethoxycarbonylbutyl group, etc.), alkenyl groups having 2 to 6 carbon atoms (an allyl group, a 1-propenyl group or a 2-butenyl group, etc.), unsubstituted aralkyl groups (a benzyl group or a phenylethyl group, etc.) or substituted aralkyl groups (a 4-methoxybenzyl group, a 4-sulfobenzyl group or a 4-sulfophenylethyl group, etc.), etc., unsubstituted aryl groups (a phenyl group or a naphthyl group, etc.) and substituted aryl groups (a 4-methoxyphenyl group, a 4-chlorophenyl group or a 4-sulfophenyl group, etc.).

Examples of preferred groups for $Y_1$ and $Y_2$ include a hydrogen atom, alkyl groups having 1 to 4 carbon atoms (for example, a methyl group, an ethyl group, a propyl group or a butyl group, etc.), a hydroxyl group, alkoxyl groups having 1 to 4 carbon atoms (for example, a methoxy group, an ethoxy group, a propoxy group or a butoxy group, etc.), a sulfo group, unsubstituted amino groups or substituted amino groups (for example, acylamido groups such as an acetamido group, a propionamido group or a benzamido group, etc.), etc.

It is preferred for the methine groups represented by $L$, $L_1$ and $L_2$ to be unsubstituted. However, one of $L$, $L_1$ and $L_2$ may be substituted with a methyl group, a phenyl group or a chlorine atom.

The above-described carboxy and sulfo group may be in the acid form or in the salt form. Examples of suitable salts are salts of alkali metals (for example, Na or K, etc.), alkaline earth metals (for example, Ca, etc.), ammonia and organic amines (for example, diethylamine, triethylamine, dimethylaniline, pyridine or piperidine, etc.), etc.

Representative examples of the dyes represented by the above-described general formulae (A), (B) and (C) are those described in the Tables 1 to 5 below. However, the dyes of the present invention are not to be construed as being limited to these dyes only.

Table 1

| Dye No. | $R_1$ | $R_2$ |
|---|---|---|
| 1 | —CH$_3$ | 2-SO$_3$Na, 5-(phenoxy)phenyl |
| 2 | phenyl | 2-SO$_2$Na, 5-SO$_3$Na phenyl |
| 3 | —CH$_2$—phenyl | 3-(SO$_3$H·N(C$_2$H$_5$)$_3$)phenyl |
| 4 | 4-SO$_3$K-phenyl | 4-SO$_3$K-phenyl |
| 5 | —CH$_3$ | —CH$_3$ |
| 6 | phenyl | 2,4-dichlorophenyl |
| 7 | —CH$_3$ | 4-SO$_3$K-phenyl |

Table 2

| Dye No. | $R_1$ | $R_2$ | L |
|---|---|---|---|
| 8 | $-CH_3$ | ⌬-$SO_3K$ | CH |
| 9 | $-CH_2SO_3Na$ | $-CH_2CH_2CN$ | CH |
| 10 | $-CH_3$ | $-H$ | CH |
| 11 | $-CH_3$ | ⌬ | CH |
| 12 | $-CH_3$ | ⌬-$SO_3H \cdot N(C_2H_5)_3$ | CCl |
| 13 | $-CH_3$ | $-CH_2CH_2CH_2SO_3H$ · pyridine | CCl |
| 14 | ⌬($SO_3K$)$_2$ | $-CH_3$ | CH |

Table 2-continued

| Dye No. | $R_1$ | $R_2$ | L |
|---|---|---|---|
| 15 | ⌬ | ⌬-$SO_3K$ | CH |
| 16 | $-CH_2CH_2SO_3K$ | benzoxazole | CH |
| 17 | $-CH_2CH_2SO_3H$ | $-C_8H_{17}$ | CH |
| 18 | $-CH_2COOC_2H_5$ | ⌬-$SO_3K$ | CH |
| 19 | $-COOH$ | ⌬-$SO_3Na$ | CCl |
| 20 | ⌬ | 2,5-dichlorophenyl | CH |
| 21 | $-COOC_2H_5$ | ⌬-$SO_3Na$ | CH |

Table 3

| Dye No. | $R_1$ | $R_2$ | =He |
|---|---|---|---|
| 22 | $-CH_3$ | ⌬ | benzoxazole, N-$C_2H_5$ |
| 23 | $-CH_3$ | ⌬-$SO_3Na$ | benzoxazole, N-$CH_2CH_2CH_2SO_3Na$ |

Table 3-continued
| Dye No. | R₁ | R₂ | =(He) |
|---|---|---|---|
| 24 | —CH₂CH₂Cl | 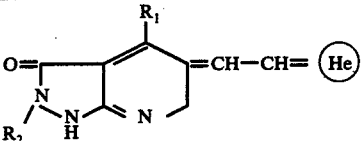 | 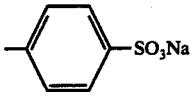 |
| 25 | 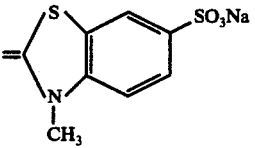 | 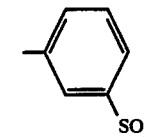 | 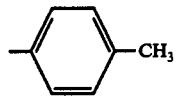 |
| 26 | —CH₃ |  | 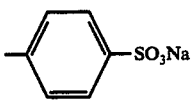 |
| 27 | —CH₃ | 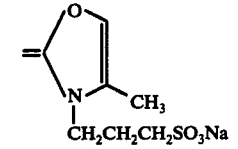 | 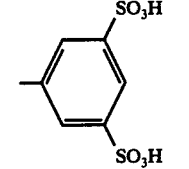 |
| 28 | 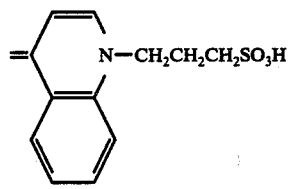 | 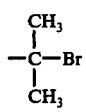 | 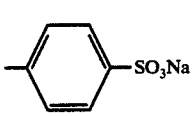 |
| 29 | —CH₂CH₂SO₃Na | 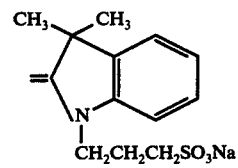 | 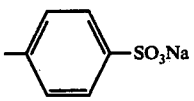 |
Table 4
| Dye No. | R₁ | R₂ | =(He) |
|---|---|---|---|
| 30 | —C₁₇H₃₅ | 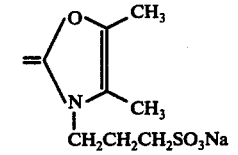 | 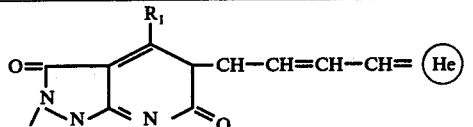 |

Table 4-continued
| Dye No. | $R_1$ | $R_2$ | = He |
|---|---|---|---|
| 31 | —COOH | 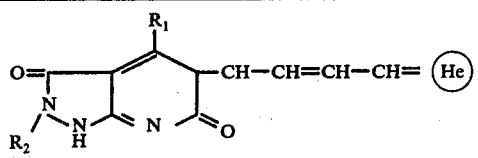 | 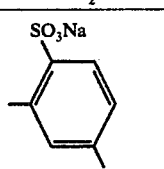 |
| 32 | 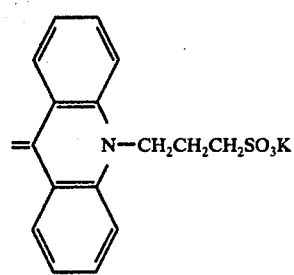 | 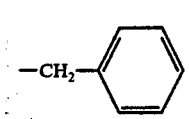 | 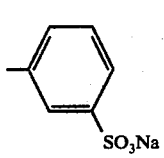 |
| 33 | —CH$_3$ | 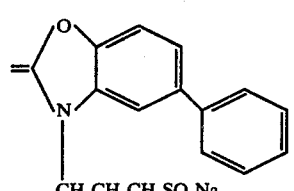 | 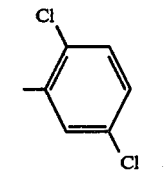 |
| 34 | —CH$_3$ | 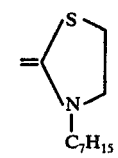 | 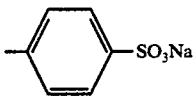 |
| 35 | —CH$_2$CH$_2$CN | 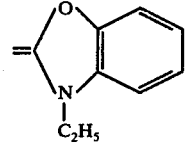 | 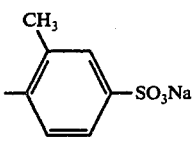 |
| 36 | —CH$_2$COOC$_2$H$_5$ | 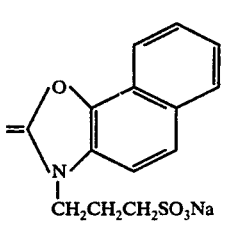 | 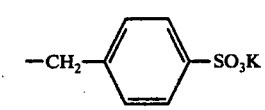 |
| 37 | —CH$_3$ | 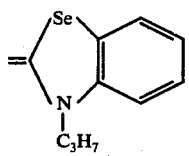 | 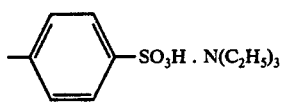 |

Table 5

[Structure shown with substituents $R_1$, $R_2$, $Y_1$, $Y_2$, $R_4$, $R_5$]

| Dye No. | $R_1$ | $R_2$ | $Y_1$ | $Y_2$ | $R_4$ | $R_5$ |
|---|---|---|---|---|---|---|
| 38 | —CH₃ | —⌬—SO₃K | —H | —H | —CH₃ | —CH₃ |
| 39 | —CH₃ | —⌬—SO₃Na | —H | —H | —CH₃ | —CH₂CH₂SO₃Na |
| 40 | —⌬ | 2,4-Cl₂C₆H₃— | 2-CH₃* | —H | —CH₃ | —CH₃ |
| 41 | —CH₃ | —CH₂CH₂SO₃Na | 2-CH₃ | —H | —C₂H₅ | —CH₂CH₂NHSO₂CH₃ |
| 42 | —⌬ | 2,5-(SO₃K)₂C₆H₃— | —H | —H | —CH₂CH₂CN | —CH₂CH₂COOH |
| 43 | —COOC₂H₅ | 2,5-(SO₃Na)₂C₆H₃— | 2-CH₃ | 6-CH₃ | —C₂H₅ | —C₂H₅ |

*Numeral shown for $Y_1$ and $Y_2$ indicates position substituted.

The dyes of the present invention can be produced with using ketomethylene compounds represented by the general formula (D):

[Structure (D)]

(D)

wherein $R_1$ and $R_2$ each has the same meaning as in the general formulae (A), (B) and (C).

Examples of typical compounds represented by the general formula (D) include the following compounds. However, the compounds represented by the general formula (D) which can be used to produce the compounds of the present invention are not to be construed as being limited to these compounds only.

Table 6

[Structure with $R_1$ and $R_2$ substituents]

| Compound D No. | $R_1$ | $R_2$ |
|---|---|---|
| D-1 | —CH₃ | —CH₃ |
| D-2 | —CH₃ | —H |
| D-3 | —CH₃ | 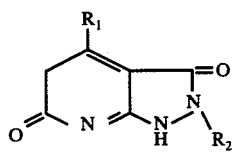 |
| D-4 | —CH₃ | 2,4-Cl₂C₆H₃— |

Table 6-continued

Structure: pyrazolo-pyridine with R₁ and R₂ substituents

| Compound D No. | R₁ | R₂ |
|---|---|---|
| D-5 | —CH₃ | 4-SO₃H-phenyl |
| D-6 | —CH₃ | 2-phenoxy-5-methyl-phenyl with SO₃H |
| D-7 | —CH₃ | 3,5-di(SO₃H)-phenyl |
| D-8 | —CH₃ | —CH₂CH₂SO₃H |
| D-9 | —CH₃ | —CH₂CH₂CH₂SO₃H |
| D-10 | —C₁₇H₃₅ | 4-SO₃H-phenyl |
| D-11 | —CH₂SO₃H | —CH₂CH₂CN |
| D-12 | —CH₂CH₂SO₃H | —C₈H₁₇ |
| D-13 | —CH₂CH₂SO₃H | 2-(benzoxazol-2-yl)-phenyl-SO₃H |
| D-14 | —CH₂CH₂SO₃H | 4-SO₃H-phenyl |
| D-15 | —CH₂CH₂Cl | 4-SO₃H-phenyl |
| D-16 | —CH₂COOC₂H₅ | 4-SO₃H-phenyl |
| D-17 | —C(CH₃)₂Br | 4-SO₃H-phenyl |
| D-18 | —CH₂—phenyl | 3-SO₃H-phenyl |
| D-19 | —CH₂CH₂CN | 3-methyl-4-SO₃H-phenyl |
| D-20 | —CH₂COOC₂H₅ | —CH₂-(4-SO₃H-phenyl) |
| D-21 | 4-methyl-phenyl | 2,4-dichloro-phenyl |
| D-22 | phenyl | 4-SO₃H-phenyl |
| D-23 | phenyl | 3,5-di(SO₃H)-phenyl |
| D-24 | 4-SO₃H-phenyl | 4-CH₃-phenyl |
| D-25 | 4-SO₃H-phenyl | 4-SO₃H-phenyl |
| D-26 | phenyl | 2,4-di(SO₃Na)-phenyl |
| D-27 | —COOH | 4-SO₃H-phenyl |
| D-28 | —COOH | 2,4-di(SO₃Na)-phenyl |
| D-29 | —COOC₂H₅ | 4-SO₃Na-phenyl |
| D-30 | —COOC₂H₅ | 2,4-di(SO₃Na)-phenyl |

Some of these pyrazolo-pyridine compounds represented by the general formula (D) are by synthesized according to the processes described in *Bulletin de la*

Societe Chimique de France, page 1929 (1970) and Chemische Berichte, Vol. 93, page 1106 (1960).

Other compounds represented by the general formula (D) can be synthesized using the process described in Japanese Patent Application 27939/76. Namely, they can be synthesized by condensing a compound represented by the general formula ($D_O$):

with a compound represented by the general formula ($D_1$):

under acid conditions.

In the formulae ($D_O$) and ($D_1$), $R_1'$ represents an alkyl group (which has 1 to 18 carbon atoms and which includes both unsubstituted and substituted alkyl groups), an aryl group (which can be monocyclic or bicyclic and which includes both unsubstituted and substituted aryl groups), an alkoxycarbonyl group (the alkoxy moiety of which has 1 to 18 carbon atoms) or a carboxyl group.

$R_2'$ represents an alkyl group (which has 1 to 18 carbon atoms and which includes both unsubstituted and substituted alkyl groups), an aryl group (which can be monocyclic or bicyclic and which includes both unsubstituted and substituted aryl groups) or a 5- or 6-membered heterocyclic group.

$R_3'$ represents an alkyl group (which has 1 to 18 carbon atoms and which includes both unsubstituted and substituted alkyl groups) or an aryl group (which can be monocyclic or bicyclic and which includes both unsubstituted and substituted aryl groups).

The compounds represented by the general formula (D) are produced by mixing 1 equivalent of the compound represented by the general formula ($D_O$) with about 0.5 to about 2 equivalents of the compound represented by the general formula ($D_1$) and heating the mixture to about 25 to about 250° C and preferably 70° to 170° C in an acid solvent or under acid conditions in the presence or absence of a solvent. Suitable acid solvents which can be advantageously used include glacial acetic acid, acetic acid anhydride, formic acid, oxalic acid, propionic acid, hydrochloric acid, hydrobromic acid and the like.

In the formula ($D_O$), $R_1'$ may also represent an aryloxycarbonyl group or an amino group.

The β-ketoester compound represented by the general formula ($D_O$) can be synthesized using the process described in Belgian Patent 634,665; Organic Reactions, Vol. 1, page 267; Journal of the American Chemical Society, Vol. 51, page 3637 (1929) and the like.

The 3-aminopyrazolone compound represented by the general formula ($D_1$) can be synthesized using the process described in French Patent 1,555,513; Chemical Abstracts, Vol. 70, page 115056 (1969); Journal of the American Chemical Society, Vol. 71, page 983 (1949); Journal of the American Chemical Society, Vol. 66, page 1849 (1944); Yakugaku-zasshi (Pharmacy Bulletin), Vol. 74, page 726 and the like.

The oxonol dyes represented by the general formula (A) can be produced by condensation of a compound represented by the general formula (D) with a compound represented by the following formulae (E), (F) or (G).

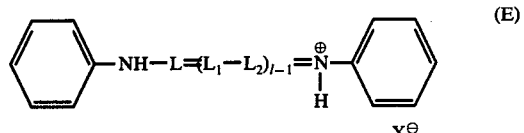

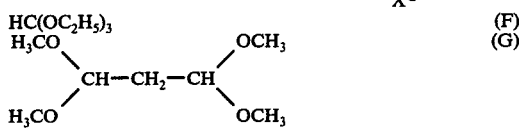

In the formula (E), X represents an acid anion (for example, chloride, bromide, iodide, thiocyanate, sulfamate, perchlorate, methyl sulfate, ethyl sulfate or p-toluenesulfonate, etc.). L, $L_1$, $L_2$ and $l$ each has the same meaning as described above for the general formulae (A), (B) and (C).

Although the condensation reaction may be carried out in the presence of or in the absence of a solvent, it is advantageous to use a solvent which dissolves the ketomethylene compounds represented by the general formula (D) (for example, alcohols, ethers, esters or benzene, etc.).

Examples of suitable solvents which can be used include dimethylformamide, dimethylacetamide, pyridine nitrobenzene, monochlorobenzene, o-dichlorobenzene, dimethylsulfoxide, methyl Cellosolve, n-butyl Cellosolve, n-butanol, 2-ethylhexyl alcohol, n-hexyl alcohol, n-amyl alcohol, cyclohexanol, propylene glycol, diethylene glycol, dipropylene glycol, di-n-butyl carbonate and γ-butyrolactone, etc.

Although the condensation reaction may be carried out in the presence of or in the absence of a catalyst, the reaction can be accelerated by using a base as a catalyst. Examples of preferred bases include triethylamine, diethanolamine, pyridine, piperidine and gaseous ammonia, etc.

The ketomethylene compound represented by the general formula (D) may be used in an amount of about 1.5 to about 4 times on a molar basis to the compound represented by the general formula (E), (F) or (G).

Although the reaction may be carried out at a temperature of from room temperature (about 20°–30° C) to the reflux temperature, it is preferred to carry out the reaction at a temperature of above about 100° C.

The merocyanine dyes represented by the general formula (B) can be produced by condensation of a ketomethylene compound represented by the general formula (D) with a compound represented by the following formula (H):

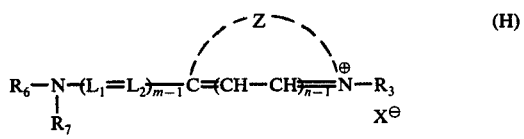

In the formula, Z, $R_3$, $L_1$, $L_2$, $m$, $n$ and X each has the same meaning as described above for the general formulae (A), (B) and (C). $R_6$ represents an acyl group (for example, an acetyl group, a propionyl group or a benzoyl group, etc.). $R_7$ represents an aryl group (for example, a phenyl group or a tolyl group, etc.).

The condensation reaction is advantageously carried out in the presence of a solvent. Suitable solvents which can be used are alcohols (for example, methanol, ethanol, isopropanol, n-butanol, 2-ethylhexyl alcohol, n-hexyl alcohol, n-amyl alcohol, cyclohexanol or propylene glycol, etc.), ethylene glycol monoalkyl ethers (for example, ethylene glycol monomethyl ether, etc.), amides (for example, acetamide or dimethylformamide, etc.), acetone, 1,4-dioxane, pyridine and γ-butyrolactone, etc.

Although the condensation reaction may be carried out in the presence of or in the absence of a catalyst, the reaction can be accelerated by a base as a catalyst. Examples of preferred bases include triethylamine, diethanolamine, pyridine, piperidine, N,n-dimethylaniline and gaseous ammonia, etc.

The ketomethylene compound represented by the general formula (D) may be used in an amount of about 0.5 to about 2 times on a molar basis to the compound represented by the formula (H).

Although the reaction may be carried out at a temperature of from about room temperature to the reflux temperature, it is preferred to carry out the reaction at a temperature of above about 100° C.

The arylidene dyes represented by the general formula (C) can be produced by condensation of a ketomethylene compound represented by the general formula (D) with an aldehyde compound represented by the following general formula (J):

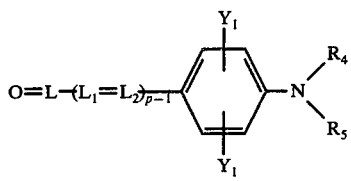

(J)

In the formula, $R_4$, $R_5$, $Y_1$, $Y_2$, L, $L_1$, $L_2$ and p each has the same meaning as described above for the general formulae (A), (B) and (C).

Although the condensation reaction may be carried out in the presence of or in the absence of a solvent, it is advantageous to use a solvent which dissolves the ketomethylene compounds represented by the general formula (D). Examples of suitable solvents include alcohols (for example, methanol, ethanol, isopropanol, n-butanol, 2-ethylhexyl alcohol, n-hexyl alcohol, n-amyl alcohol, cyclohexanol or propylene glycol, etc.), ethylene glycol monoalkyl ethers (for example, ethylene glycol monomethylene ether, etc.), amides (for example, acetamide, or dimethylformamide, etc.), acetone, 1,4-dioxane, pyridine, γ-butyrolactone and carboxylic acids (for example, formic acid, oxalic acid or acetic acid, etc.). The solvents may be used individually or as a mixture thereof.

Although the condensation reaction may be carried out in the presence of or absence of a catalyst, the reaction can be accelerated by using acids and/or bases as a catalyst. Examples of suitable acids include acetic acid, oxalic acid, formic acid, acetic acid anhydride and hydrochloric acid, etc. Examples of suitable bases include triethylamine, diethanolamine, pyridine, piperidine, N,N-dimethylaniline and gaseous ammonia, etc.

The ketomethylene compound represented by the general formula (D) may be used in an amount of about 0.5 to about 3 times on a molar basis to the compound represented by the formula (J).

Although the reaction may be carried out at a temperature of from about room temperature to the reflux temperature, it is preferably carried out at above about 70° C.

The dyes having a pyrazolo(3,4-b)pyridine nucleus according to the present invention have various advantageous characteristics, some of which are enumerated below.

(1) The dyes have a very high absorbancy index.

(2) The dyes have an absorption of light at very long wavelengths.

(3) The dyes are very stable in solution.

(4) The dyes are easily and irreversibly decolored in solutions of sulfites.

(5) The dyes are substantially inert in photographic emulsions.

(6) The dyes have a very wide absorption in an aqueous solution and in gelatin.

On considering characteristic (2) above, it has been very difficult to obtain practical dyes having an absorption maximum wavelength above 650 nm from dyes having a pyrazolin-5-one nucleus described in the prior art. According to the present invention, however, practical dyes having an absorption maximum wavelength above 650 nm can be easily obtained.

With respect to characteristic (3) above, known dyes having a pyrazolone nucleus which have an absorption maximum wavelength longer than 600 nm are very unstable. However, the dyes of the present invention are very stable even though they have a maximum absorption at a wavelength longer than that of dyes having a pyrazolone nucleus.

As to characteristic (4) above, the dyes of the present invention do not cause environmental pollution, because they are very easily decolored in photographic processing solutions containing sulfites and their color does not reappear.

As described above, the dyes of this invention are very useful as dyes for filter layers, antihalation layers and photographic emulsion layers of photographic light-sensitive materials, because they are photographically inert and have characteristic spectral absorption wavelengths, good decoloration properties and good stability.

Comparison Example

As the result of the comparing the spectral absorption of the dyes of the present invention with that of known dyes having a corresponding structure containing a pyrazolone nucleus, the following results were obtained.

| Dyes Having a Pyrazolone Nucleus (known dyes) | Dyes Having a Pyrazolo-pyridine Nucleus (dyes of the present invention) |
|---|---|
| Monomethine Oxonol Type Dye (Known Dye B), $\lambda_{max}^{H_2O} = 430$ nm | Monomethine Oxonol Type Dye (Dye 7), $\lambda_{max}^{H_2O} = 600$ nm |
| Trimethine Oxonol Type Dye (Known Dye C), $\lambda_{max}^{H_2O} = 521$ nm | Trimethine Oxonol Type Dye (Dye 8), $\lambda_{max}^{H_2O} = 610$ nm, 650 nm |
| Merocyanine Type Dye (Known Dye D), $\lambda_{max}^{H_2O} = 446$ nm | Merocyanine Type Dye (Dye 23), $\lambda_{max}^{H_2O} = 484$ nm |
| Benzylidene Type Dye (Known Dye E) | Benzylidene Type Dye (Dye 39) |

-continued

| Dyes Having a Pyrazolo-pyridine Nucleus (dyes of the present invention) | Dyes Having a Pyrazolone Nucleus (known dyes) |
|---|---|

Pyrazolo-pyridine dye: $\lambda_{max}^{H_2O} = 600$ nm

Pyrazolone dye: $\lambda_{max}^{H_2O} = 486$ nm

As can be understood from the above-described comparison, the oxonol type and benzylidene type dyes of the present invention have an absorption in a wavelength which is more than 100 nm longer than the absorption wavelength of the corresponding known dyes having a pyrazolone nucleus, which would not be expected from the characteristics of the prior art dyes.

The synthesis and use of the dyes of the present invention are illustrated in greater detail with reference to the following examples. Unless otherwise indicated herein, all parts, percents, ratios and the like are by weight.

of each dye in solution, the solvent used and the color in a gelatin film are shown in Table 7 below.

Table 7

| Dye | Maximum Absorption Wavelength (nm) | Solvent | Color of Gelatin Film |
|---|---|---|---|
| 1 | 612 | Methanol | Purplish blue |
| 2 | 620 | Methanol | Blue |
| 3 | 614 | Methanol | Purplish blue |
| 4 | 613 | Water | Purplish blue |
| 5 | 605 | Methanol | Bluish violet |
| 6 | 622 | Methanol | Blue |
| 7 | 610 | Methanol | Purplish blue |
|   | 600 | Water | Bluish violet |

EXAMPLE 1

Preparation of Dye 7

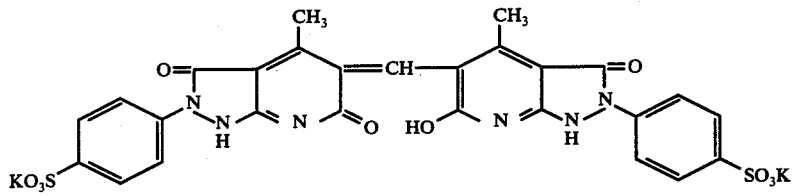

A mixture of 72 g of the triethylamine salt of 3-amino-1-(4'-sulfophenyl)pyrazolin-5-one, 26 g of ethyl acetoacetate and 400 ml of glacial acetic acid was refluxed for 4 hours with heating. Insoluble matter was removed by filtration and the filtrate was condensed to about ⅓ of the original volume. To this solution, about 500 ml of isopropanol was added to yield a crystalline precipitate. The cryltalline precipitate was separated by filtration by means of suction and washed with isopropanol. The resulting crystals were recrystallized from methanol to obtain 58 g of the triethylamine salt of 4-methyl-2-(4'-sulfophenyl)pyrazolo[3,4-b]pyridine-3,6-dione (melting point: 272°–275° C). 42.2 g of the resulting salt was added to 300 ml of nitrobenzene and heated in an oil bath.

7.4 g of ethyl orthoformate was then added to the above-described mixture and the mixture was refluxed with heating. After the reaction was carried out for about 30 minutes, the mixture was cooled to about 80° C. A solution containing 16.6 g of potassium iodide in 50 ml of methanol was then added thereto. The reaction solution was added to 300 ml of isopropanol and a crystalline precipitate was separated by filtration by means of suction. After washing with about 300 ml of methanol, the resulting crystals were dried, by which 19 g of the objective blackish brown dye (melting point: above 300° C) was obtained. The resulting dye when dissolved in water or methanol yielded a bluish violet solution. On measuring the absorption of the solution by means of a spectrophotometer, the following results were obtained.

$\lambda_{max}^{H_2O} = 600$ nm   $\lambda_{max}^{MeOH} = 610$ nm

Dyes 1–6 were produced in the same manner as Dye 7 in Example 1. The maximum absorption wavelength

EXAMPLE 2

Preparation of Dye 8

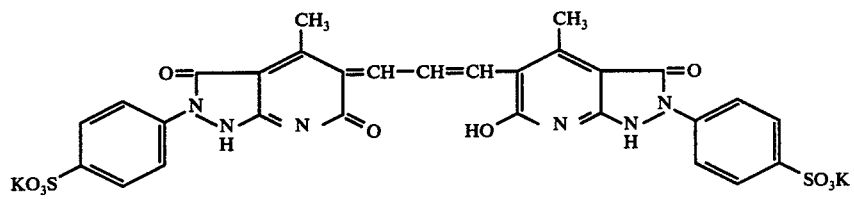

84.4 g of the triethylamine salt of 4-methyl-2-(4'-sulfophenyl)pyrazolo[3,4-b]pyridine-3,6-dione was added to 800 ml of γ-butyrolactone and the mixture was heated in an oil bath.

22.2 g of malondialdehyde dianil was dissolved in 80 ml of γ-butyrolactone. The resulting solution was added to the above-described mixture. The mixture was refluxed with heating. After reacting for about 10 minutes, the solution became blue. This reaction solution was filtered. To the filtrate a solution containing 19.6 g of potassium acetate in 100 ml of methanol was added to yield a crystalline precipitate. The crystalline precipitate was separated by filtration and washed with about 500 ml of methanol. The resulting crystals were dried to obtain 43 g of the objective dark violet dye (melting point: above 300° C). The resulting dye when dissolved in water or methanol yielded a blue solution. On measuring the absorption of the solution by means of a spectrophotometer, the following results were obtained:

$\lambda_{max}^{H_2O} = 610$ and $650$ nm, $\lambda_{max}^{MeOH} = 670$ nm

EXAMPLE 3

Preparation of Dye 8

A mixture of 12 g of the potassium salt of 4-methyl-2-(4'-sulfophenyl)pyrazolo[3,4-b]pyridine-3,6-dione and 60 ml of dimethylformamide (DMF) was refluxed with heating while stirring. To the mixture, a solution containing 3 g of tetramethoxypropane in 20 ml of γ-butyrolactone was added and the resulting mixture was reacted for 30 minutes. After cooling the mixture, about 70 ml of isopropanol was added and the mixture was filtered by means of suction. After washing with methanol and drying, 12.2 g of the objective black dye was obtained. The resulting dye when dissolved in water or methanol yielded a blue solution. On measuring the absorption of the solution by means of a spectrophotometer, the following results were obtained.

$\lambda_{max}^{H_2O}$ = 610 and 650 nm, $\lambda_{max}^{MeOH}$ = 670 nm

EXAMPLE 4

Preparation of Dye 15 the crystals. After drying, 11.2 g of the objective blackish blue dye was obtained. The resulting dye when dissolved in water or methanol yielded a blue solution. On measuring the absorption of the solution by means of a spectrophotometer, the following results were obtained.

$\lambda_{max}^{H_2O}$ = 624 nm, $\lambda_{max}^{MeOH}$ = 678 nm

EXAMPLE 5

Preparation of Dye 18

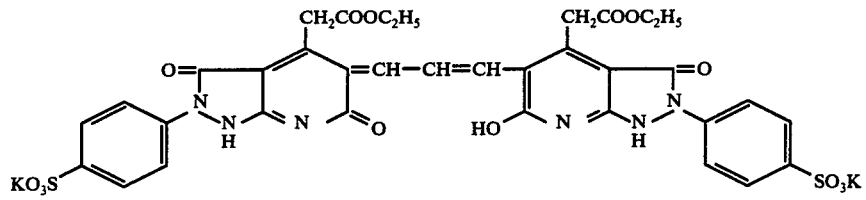

A mixture of 14.4 g of the triethylamine salt of 3-

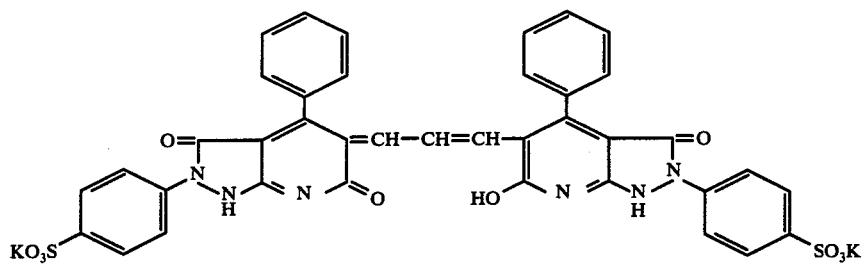

36.2 g of the triethylamine salt of 3-amino-1-(4'-sulfophenyl)pyrazolin-5-one was added to 300 ml of glacial acetic acid, and the resulting mixture was heated to dissolve this salt. Any insoluble matter was removed by filtration. To the solution, 21 g of ethyl benzoylacetate was added, and the solution was condensed by heating.

Condensation nearly to complete dryness was conducted under a reduced pressure to obtain an oily material. To the resulting oily material, 350 ml of ethyl acetate was added, and the mixture was stirred to yield a crystalline precipitate. The crystalline precipitate was separated by filtration and dried immediately. By recrystallization from methanol, 33 g of a light brown compound was obtained (melting point: 246°-9° C).

32 g of the resulting triethylamine salt of 4-phenyl-2-(4'-sulfophenyl)pyrazolo[3,4-b]pyridine was added to 100 ml of methanol. Further, 6.4 g of potassium acetate was added thereto. The mixture was stirred for 30 minutes with heating. The mixture was then condensed to about ⅓ of the original volume. After cooling, the resulting crystalline precipitate was separated by filtration by means of suction. After washing with methanol, 242 g of a light brown compound was obtained (melting point: above 300° C).

A mixture of 15 g of the resulting potassium salt of 4-phenyl-2-(4'-sulfophenyl)pyrazolo[3,4-b]pyridine-3,6-dione and 60 ml of γ-butyrolactone was heated. To the mixture, 3.6 g of tetramethoxypropane was added and the mixture was refluxed with heating. After reacting for about 1 hour, the reaction mixture was cooled and the crystalline precipitate was separated by filtration by means of suction. The resulting crystals were dissolved in water and reprecipitated by using acetone to purify amino-1-(4'-sulfophenyl)pyrazolin-5-one, 9.0 g of acetonedicarboxylic acid ethyl ester and 120 ml of glacial acetic acid was condensed with heating. After condensation to about ¼ of the original volume, about 200 ml of ethyl acetate was added to yield a crystalline precipitate. The resulting crystalline precipitate was separated by filtration by means of suction and washed with isopropanol. By recrystallization from methanol, 15.0 g of the objective compound was obtained (melting point: 145°-150° C).

A mixture of 10 g of the resulting triethylamine salt of 4-ethoxycarbonylmethyl-2-(4'-sulfophenyl)-pyrazolo[3,4-b]pyridine-3,6-dione and 20 ml of DMF was heated to completely dissolve the salt. To the solution, a solution containing 3.3 g of tetramethoxypropane in 10 ml of γ-butyrolactone was added, and the mixture was heated for about 5 minutes. To the mixture, a solution containing 2 g of potassium acetate in 10 ml of methanol was added. After stirring the solution for a little while, the solution was cooled and the resulting crystalline precipitate was separated by filtration by means of suction. After washing with methanol, the precipitate was dried, by which 13.5 g of the objective black dye was obtained. The resulting dye when dissolved in water or methanol yielded a blue solution. On measuring the absorption of the solution by means of a spectrophotometer, the following results were obtained.

$\lambda_{max}^{H_2O}$ = 660 nm, $\lambda_{max}^{MeOH}$ = 680 nm

EXAMPLE 6

Preparation of Dye 21

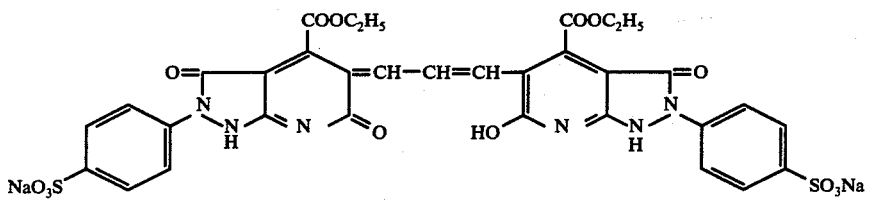

28.8 g of the triethylamine salt of 3-amino-1-(4'-sulfophenyl)pyrazolin-5-one was added to 240 ml of glacial acetic acid to dissolve the salt with heating. Any insoluble matter was removed by filtration. To the resulting solution, 21.6 g of sodium ethyl oxalate acetate was added, and the mixture was condensed with heating on a water bath under a reduced pressure. A crystalline precipitate was obtained when condensation was nearly complete. The crystalline precipitate was separated by filtration, washed with ethyl acetate and dried immediately. By recrystallizing from glacial acetic acid, 28.4 g of a yellow compound (melting point: above 300° C) was obtained.

A mixture of 26.7 g of the resulting sodium salt of 4-ethoxycarbonyl-2-(4'-sulfophenyl)pyrazolo[3,4-b]pyridine-3,6-dione, 100 ml of N,N-dimethylformamide and 4 ml of pyridine was refluxed with heating. To this mixture, a solution containing 5.0 g of tetramethoxypropane in 25 ml of γ-butyrolactone was added. After refluxing for about 30 minutes with heating, the reaction solution was cooled and the resulting crystalline precipitate was separated by filtration by means of suction. After washing with isopropanol, the precipitate was dried, by which 22.3 g of the objective black dye was obtained. The resulting dye when dissolved in water or methanol yielded a blue solution. On measuring the absorption of the solution, the following results were obtained.

$\lambda_{max}^{H_2O} = 686$ nm, $\lambda_{max}^{MeOH} = 700$ nm

EXAMPLE 7

Preparation of Dye 20

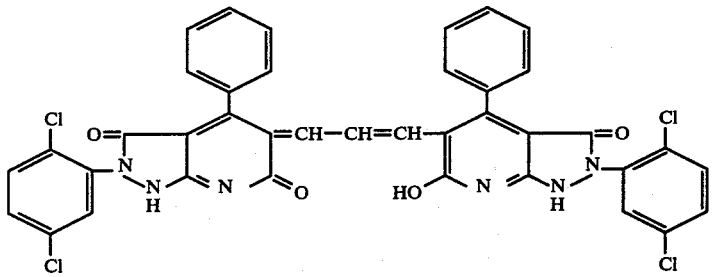

A mixture composed of 48.8 g of 3-amino-1-(2',5'-dichlorophenyl)pyrazolin-5-one, 38.4 g of ethyl benzoylacetate and 200 ml of glacial acetic acid was refluxed for 6 hours with heating. After the reaction solution was allowed to stand for one night, the resulting crystalline precipitate was separated by filtration. After washing with isopropanol, the precipitate was recrystallized from ethanol, by which 37.8 g of a compound (melting point: 208°-211° C) was obtained.

37 g of the resulting 4-phenyl-2-(2',5'-dichlorophenyl)pyrazolo[3,4-b]pyridine-3,6-dione and 11 g of malondialdehyde dianil were added to 300 ml of 2-ethylhexyl alcohol, and the mixture was refluxed on an oil bath with heating. After reacting for 20 minutes, the mixture was cooled to yield a crystalline precipitate. The resulting crystalline precipitate was separated by filtration and washed with about 100 ml of ethyl acetate. The precipitate was recrystallized from methanol, by which 21 g of the objective dark violet dye was obtained. The resulting dye when dissolved in water or methanol yielded a blue solution. On measuring the absorption of the solution by means of a spectrophotometer, the following result was obtained.

$\lambda_{max}^{H_2O} = 682$ nm

EXAMPLE 8

Preparation of Dye 10

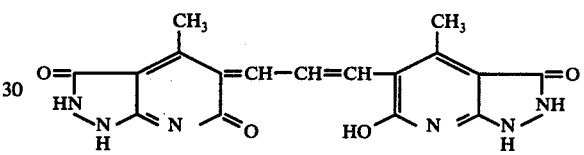

20 g of 3-amino-pyrazolin-5-one and 26 g of ethyl acetoacetate were added to 80 ml of a 30% aqueous solution of hydrochloric acid and the mixture was heated for about 30 minutes. After the reaction was over, the reaction mixture was neutralized using a 20% aqueous solution of sodium hydroxide and the resulting crystalline precipitate was separated by filtration by means of suction. After drying, 25 g of the objective compound was obtained. Melting point: above 300° C.

A mixture of 16.5 g of the resulting 4-methylpyrazolo[3,4-b]pyridine-3,6-dione, 8.2 g of tetramethoxypropane, 50 ml of DMF and 20 ml of γ-butyrolactone was refluxed for 10 minutes in an oil bath with heating. After the reaction was over, the mixture was cooled and the resulting crystalline precipitate was separated by filtration. After washing with isopropanol and drying, 12.1 g of the objective black dye was obtained. The resulting dye when dissolved in dimethyl sulfoxide (DMSO) yielded a blue solution. On measuring the absorption of this solution, the following result was obtained.

$\lambda_{max}^{DMSO} = 691$ nm

Dyes were prepared in the same manner as the dyes in Examples 2 to 8. The solvent used in preparing a solution of each dye, the maximum absorption wavelength of the solution and the color in a gelatin film are shown in Table 8 below.

Table 8

| Dye | Maximum Absorption Wavelength (nm) | Solvent | Color in Gelatin Film |
|---|---|---|---|
| 8 | 610 and 650 | Water | Blue |
| 9 | 667 | Water | Greenish blue |
| 10 | 691 | DMSO | Blue |
| 11 | 682 | Methanol | Bluish green |
| 12 | 665 | Methanol | Greenish blue |
| 13 | 663 | Methanol | Greenish blue |
| 14 | 656 | Water | Blue |
| 15 | 624 | Water | Bluish green |
| 16 | 667 | Methanol | Bluish green |
| 17 | 662 | Methanol | Greenish blue |
| 18 | 660 | Water | Greenish blue |
| 19 | 672 | Water | Bluish green |
| 20 | 682 | Methanol | Bluish green |
| 21 | 686 | Water | Greenish blue |

EXAMPLE 9

Preparation of Dye 23

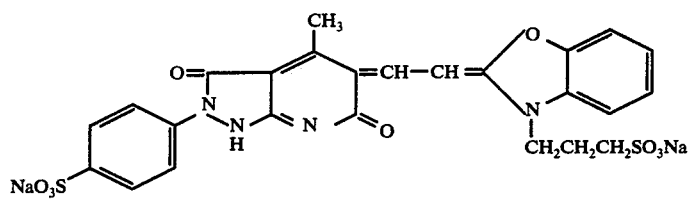

12 g of acetic acid anhydride and 15 g of triethylamine were added one after the other to a mixture of 12.6 g of triethylamine salt of 4-methyl-2-(4'-sulfophenyl)-pyrazolo[3,4-b]pyridine-3,6-dione, 10.7 g of anhydro-2-(2-anilinovinyl)-3-(3-sulfopropyl)benzoxazolium hydroxide and 70 ml of γ-butyrolactone. After the addition, the mixture was refluxed for about 15 minutes with heating and the reaction solution was then filtered. To the filtrate, a solution containing 4.5 g of sodium iodide in 10 ml of methanol was added with stirring. A crystalline precipitate was obtained. The resulting crystalline precipitate was separated by filtration by means of suction and washed with about 200 ml of methanol. The resulting crystals were dried, by which the objective orangish yellow dye 9.5 g was obtained (melting point: above 300° C). The resulting dye when dissolved in water yielded a reddish orange solution. On measuring the absorption maximum of this solution by means of a spectrophotometer, the following result was obtained.

$\lambda_{max}^{H_2O} = 484$ nm

EXAMPLE 10

Preparation of Dye 34

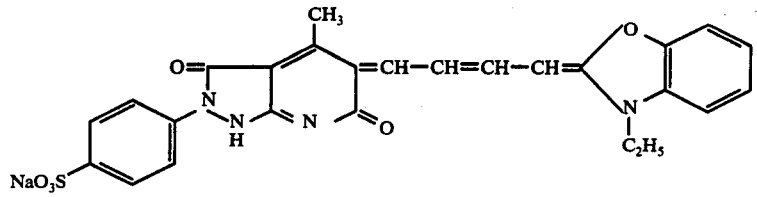

A mixture of 4.2 g of the triethylamine salt of 4-methyl-2-(4'-sulfophenyl)pyrazolo[3,4-b]pyridine-3,6-dione, 4.6 g of 2-(4-acetoanilide-1,3-butadienyl)-3-ethylbenzoxazolium bromide, 20 ml of γ-butyrolactone and 2 ml of triethylamine was heated to 190° C for about 5 minutes. The reaction solution was filtered and a solution containing 1.5 g of sodium iodide in 5 ml of methanol was added to the filtrate. After cooling the mixture, about 50 ml of isopropanol was added and the resulting crystalline precipitate was separated by filtration. By washing with about 50 ml of ethanol and about 50 ml of methanol and drying, 2.9 g of the objective dark violet dye (melting point: above 300° C) was obtained. The resulting dye when dissolved in DMF yielded a blue solution. On measuring the absorption of this solution by means of a spectrophotometer, the following result was obtained.

$\lambda_{max}^{DMF} = 632$ nm

Dyes were prepared in the same manner as the dyes in Examples 9 and 10. The maximum absorption wavelength of a solution of each dye, the solvent used for the solution and the color in a gelatin film are shown in Table 9 below.

Table 9

| Dye | Maximum Absorption Wavelength (nm) | Solvent | Color in Gelatin Film |
|---|---|---|---|
| 23 | 484 | Water | Reddish orange |
| 26 | 440 | Water | Orangish yellow |
| 27 | 572 | Water | Red |
| 33 | 504 | Methanol | Orangish red |
| 34 | 632 | DMF | Blue |
| 36 | 657 | Methanol | Blue |
| 37 | 663 | Methanol | Greenish blue |

EXAMPLE 11

Preparation of Dye 39

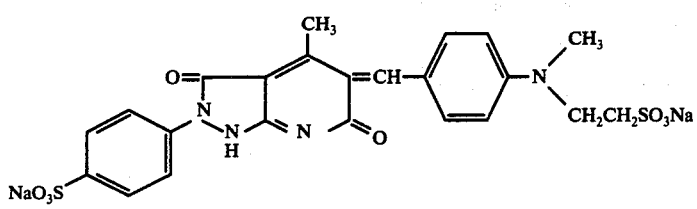

4 g of triethylamine was added to a mixture of 12.6 g of the triethylamine salt of 4-methyl-2-(4'-sulfophenyl)-pyrazolo[3,4-b]pyridine-3,6-dione, 9.0 g of the sodium salt of 4-(N-methyl-N-sulfoethyl)aminobenzaldehyde and 70 ml of γ-butyrolactone, and the mixture was stirred for about 5 minutes. 5 g of glacial acetic acid was then added thereto. The mixture was stirred at about 150° C for 15 minutes in an oil bath. 4.5 g of sodium iodide was then added thereto, and the mixture was stirred for 10 minutes. After cooling the mixture to room temperature, the resulting crystalline precipitate was separated by filtration and washed with about 100 ml of methanol. The resulting crystals were dried, by which 14.7 g of the objective dark red dye (melting point: 300° C) was obtained. The resulting dye when dissolved in water yielded a purplish red solution. On measuring the absorption of this solution by means of a spectrophotometer, the following result was obtained.
$\lambda_{max}^{H_2O} = 600$ nm Dyes were prepared in the same manner as the dye in Example 11. The maximum absorption wavelength as a solution of each dye, the solvent used for the solution and the color in a gelatin film are shown in Table 10 below.

Table 10

| Dye | Maximum Absorption Wavelength (nm) | Solvent | Color in Gelatin Film |
|---|---|---|---|
| 38 | 555 | Water | Red |
| 39 | 600 | Water | Bluish purple |
| 40 | 577 | Methanol | Reddish purple |
| 41 | 565 | Methanol | Purplish red |
| 42 | 607 | Water | Bluish purple |
| 43 | 562 | Methanol | Purplish red |
| 45 | 560 | Methanol | Red |

EXAMPLE 12

100 mg of each of Dye 8 and of known Dye (C) was dissolved respectively in 50 ml of distilled water. 50 ml of the resulting aqueous solution of each dye was mixed with 350 ml of 10% aqueous solution of gelatin and the mixture was coated on a cellulose triacetate film support in an amount of 350 ml/m² and dried. The absorption spectra of the resulting films were measured. The results obtained are shown in the FIGURE. Curve A shows the absorption spectra of Dye 8 of the present invention and Curve B shows the absorption spectra of known Dye (C). These samples were then dipped in a developing solution having the following composition:

Composition of the Developing Solution

| Water | 700 ml |
|---|---|
| N-methyl-p-aminophenol Sulfate | 2 g |
| Sodium Sulfite | 100 g |
| Hydroquinone | 5 g |
| Borax | 2 g |
| Water to make | 1 l | at 20° C for 1 minute with stirring, washed with water for 1 minute and dried. The optical density at the absorption maximum wavelength was measured again. The results obtained are shown in Table 11 as the residual color ratio which was calculated by the following relationship.

Residual Color Ratio =
$\dfrac{\text{Optical Density after Processing}}{\text{Optical Density before Processing}} \times 100$

Table 11

| Dye | Residual Color Ratio (%) |
|---|---|
| Dye 8 | 0 |
| Known Dye (C) | 2.6 |

As is clear from the results in Table 11 above, the dye of the present invention, Dye 8, has a superior residual color ratio than the known oxonol dye, Dye (C), having a pyrazolone nucleus. Further, the dye of the present invention has very wide absorption spectra as shown in the FIGURE and, consequently, it is very useful as a light absorption dye, namely, as dyes for filter layers, antihalation layers and emulsion layers.

The dyes of the present invention can be used for various photographic purposes. Thus, the dyes of the present invention can be incorporated into a coating solution to form a hydrophilic colloid layer such as a photographic emulsion layer, a filter layer, an antihalation layer, an interlayer and a protective layer, etc.

The dyes of the present invention can be used as an aqueous solution at a concentration of less than about 30 weight %, preferably less than 20 weight %.

The coating amount of the dye of the present invention in a photographic hydrophilic colloid layer generally is about 8 to about 800 mg/m².

Any known silver halides such as silver chloride, silver bromide, silver chlorobromide, silver bromoiodide, silver chloroiodide, silver chlorobromoiodide and the like can be used as the silver halide for the photographic emulsion in the present invention. In addition, halogen conversion-type silver halide grains as described in British Pat. No. 635,841 may also be used effectively.

Any hydrophilic colloid employed in usual silver halide emulsions may be used as the binder for the silver halide. For example, gelatin, albumin, gum arabic, agar agar, cellulose derivatives (e.g., carboxycellulose alkyl esters, hydroxyethyl cellulose, carboxymethylhydroxyethyl cellulose, etc.), synthetic resins (e.g., polyvinyl alcohol, polyvinyl pyrrolidone, etc.), and the like are merely a small sampling of those hydrophilic colloids which can be used in the present invention.

The generally used ratio of silver halide : binder is 1 : about from 0.1 to 20. A preferred particle size for the silver halide is from about 0.05 to about 5 microns. Neither of these ranges are limitative, and they can be varied in a manner known to the art.

Also, the photographic emulsion can be subjected to chemical ripening with active gelatin or with the use of a sulfur compound in a manner as described in U.S. Pat. Nos. 1,574,944; 1,623,499 or 2,410,689.

The photographic emulsion can be chemically sensitized with gold salts such as are described in U.S. Pat. No. 2,399,083; with reducing agents such as the stannous salts described in U.S. Pat. No. 2,487,850; reducing agents such as the polyamines described in U.S. Pat. No. 2,521,925; with bis-(beta-aminoethyl)sulfides and the water-soluble salts thereof described in U.S. Pat. No. 2,521,926; with compounds containing a labile selenium atom as described in U.S. Pat. Nos. 3,297,446; 3,297,447 and 3,442,653; can be sensitized by the addition of polyalkylene glycols as described in U.S. Pat. Nos. 2,423,549 and 2,441,389; or with various derivatives of alkylene oxides as described in U.S. Pat. No. 2,240,472 and British Pat. No. 443,559.

In the present invention, at least one photographic emulsion layer can be spectrally sensitized with a methine dye. Suitable sensitizing dyes which can be used include cyanine dyes, merocyanine dyes, complex cyanine dyes, complex merocyanine dyes, holopolar cyanine dyes, hemicyanine dyes and styryl dyes. Useful dyes are dyes such as cyanine dyes, merocyanine dyes and complex merocyanine dyes. Particularly preferred sensitizing dyes for use in the present invention are merocyanine dyes and complex merocyanine dyes. All nuclei commonly used for cyanine dyes can be used as the basic heterocyclic nucleus forming the molecules of these dyes. That is, a pyrroline nucleus, an oxazoline nucleus, a thiazoline nucleus, a pyrrole nucleus, an oxazole nucleus, a thiazole nucleus, a selenazole nucleus, an imidazole nucleus, a tetrazole nucleus, a pyridine nucleus, a nucleus in which an alicyclic hydrocarbon ring is fused to the above-described nucleus, and a nucleus in which an aromatic hydrocarbon ring is fused to the above-described nucleus, i.e., an indolenine nucleus, a benzindolenine nucleus, a benzoxazole nucleus, a naphthoxazole nucleus, a benzothiazole nucleus, a naphthothiazole nucleus, a benzoselenazole nucleus, a naphthoselenazole nucleus, a benzimidazole nucleus, a naphthoimidazole nucleus, a quinoline nucleus, and the like, can be used. These nuclei can be substituted with a substituent such as an alkyl group, an alkoxy group, a hydroxy group, a carboxy group, an alkoxycarbonyl group, an acyl group, an amino group, an alkylamino group, a dialkylamino group, an acylamino group (including an alkylsulfonylamino group), a substituted alkyl group (e.g., a haloalkyl group such as a trifluoromethyl group, etc.), an aryl group (e.g., a phenyl group, a naphthyl group, etc.), a cyano group or a halogen atom (e.g., a chlorine atom, etc.).

With merocyanine dyes or complex merocyanine dyes, a 5- or 6-membered heterocyclic nucleus containing a ketomethylene bond, such as a pyraxolin-5-one nucleus, a pyrazolidin-3,5-dione nucleus, a hydantoin nucleus, a thiohydantoin nucleus, a 2-thiaoxazolidin-2,4-dione nucleus, a thiazolidin-2,4-dione nucleus, a rhodanine nucleus, a thiobarbituric acid nucleus, and the like can be used as an acid nucleus forming the dye molecule. Particularly preferable nuclei are a thiohydantoin nucleus, a 2-thiaoxazolidin-2,4-dione nucleus, and a rhodanine nucleus.

Where complex merocyanine dyes are used, the dye molecules can comprise various combinations such as a combination of two basic nuclei and one acidic nucleus, a combination of one basic nucleus and two acidic nuclei, and a combination of two basic nuclei and two acidic nuclei.

These sensitizing dyes can be used individually or in combination. A large number of examples of the combined use of sensitizing dyes is known for the purpose of supersensitization.

In addition to the sensitizing dyes, substances which show a supersensitizing action without any substantial absorption of visible light such as the compounds containing a pyrimidinylamino group or a triazinylamino group, described in U.S. Pat. Nos. 2,933,390, 3,511,664, 3,615,613, 3,615,632, 3,615,641, etc., aromatic organic acid-formaldehyde condensates described in British Pat. No. 1,137,580, azaindenes, cadmium salts, or the like can be incorporated in the emulsion.

The light-sensitive material containing the dye of the present invention can possess a spectrally sensitized emulsion layer or layers and a spectrally non-sensitized emulsion layer or layers at the same time, with the spatial relationship of the layers in the light-sensitive material being varied as the occasion demands.

The hydrophilic colloid used in the photographic light-sensitive material of the invention is advantageously hardened by the generally used hardeners of the aldehyde series, methylol series, 1,4-dioxane series, aziridine series, isoxazole series, carbodiimide series, active halogen series, active vinyl series, etc.

The light-sensitive photographic material of the invention can be either a black-and-white photographic material which provides a final image comprising metallic silver, or a color photographic material which provides a final image comprising dyes.

In the case of color photographic light-sensitive materials, all of the ketomethylene yellow dye-forming couplers can advantageously be used. Typical examples thereof are couplers of the benzoylacetanilide series, pivalylacetanilide series, etc. Further, all of the magenta dye-forming couplers of the pyrazolone series, indazolone series, etc., can advantageously be used. In addition, all of the cyan dye-forming couplers of the phenol series, naphthol series, etc., can advantageously be used. These couplers may contain a coupling-off group at the active carbon atom positioned at the coupling site. Those couplers rendered nondiffusible with a ballast group are prefered. With respect to these couplers, a large number of ballasted compounds are well known.

These dye-forming couplers can be dispersed in a hydrophilic colloid in any known manner. They can advantageously be dispersed with the use of a coupler solvent as described in U.S. Pat. No. 2,322,027, etc.

The photographic light-sensitive material of the invention can contain a plasticizer such as glycerin, a coating aid such as saponin, polyethylene glycol monolauryl ether, etc., a lubricating agent such as a silicone resin, paraffin, etc., a matting agent such as starch, titanium dioxide, a silicate, etc., a water-soluble azo dye, a polymethine dye, a diphenylmethane dye, etc., a brightening agent of the stilbine series, triazine series, oxazole series, coumarin series, etc., antistatic agents such as the ionic polymers described in U.S. Pat. No. 2,861,056, and antioxidants such as hydroquinone derivatives, ascorbic acid, etc.

In addition, the photographic light-sensitive material of the invention can contain ultraviolet light absorbing agents such as Michler's diketone sulfonic acid, benzotriazole, etc., or or may contain colloidal silver, carbon black or the like to prevent static marks.

Examples of supports which can be advantageously used in the photographic light-sensitive material of the invention are cellulose ester films such as cellulose nitrate, cellulose acetate, etc., polyester films such as polyethylene terephthalate films, etc., polyvinyl chloride films, polystyrene films, polycarbonate films, baryta paper and alpha-olefin polymer laminated paper.

The photographic light-sensitive material of the invention can be processed in any known manner, e.g., with black-and-white developers as are commonly used, e.g., an alkaline solution containing a developing agent such as a hydroxybenzene, an aminobenzene, an aminophenol, etc., which may contain a sulfite, carbonate, bisulfite, bromide, iodide, etc. of an alkali metal. Other useful black-and-white developing agents are described, for example, in *The Theory of the Photographic Process*, 3rd Edition, pp. 278–331, MacMillan Co., New York (1967).

Color developers as are commonly used in the art can also be used in the present invention, i.e., any alkaline aqueous solution containing a color-developing agent. All known dye-forming aromatic primary amine developers such as phenylene-diamines (e.g., N,N-diethyl-p-phenylene-diamine, N-ethyl-N-hydroxyethyl-p-phenylenediamine, N-ethyl-N-hydroxyethyl-2-methyl-p-phenylenediamine, N-ethyl-beta-N-methanesulfonamidoethyl-3-methyl-4-aminoaniline, N,N-diethyl-2-methyl-p-phenylenediamine, and the sulfonates, hydrochlorides and sulfites thereof, etc.) can be used as the color-developing agents. The color developer may further contain generally used additives such as a sulfite, carbonate bisulfite, bromide or iodide of an alkali metal, benzyl alcohol and the like.

Other processing solutions, e.g., a bleaching solution, a fixing solution, a stabilizing solution, etc., known in the art also may advantageously be used. These processing solutions may be used in combinations of two or more thereof, e.g., as a bleach-fixing solution, a fix-stabilizing solution or a bleach-fix-stabilizing solution.

Such solutions are well known in the art, and any of such known solutions are useful. A bleaching solution contains a silver oxidizing agent(s), e.g., water-soluble ferricyanides, a simple water-soluble ferric, cupric or cobaltic salt, and complex salts of an alkali metal and polyvalent cations with an organic acid. Typical examples of the polyvalent cations are ferric ions, cobaltic ions, cupric ions, etc. Typical examples of the organic acids are ethylene diamine tetraacetic acid, nitrilotriacetic acid, etc. A fixing solution contains a silver halide solvent(s) for example, a water-soluble thiosulfate, water-soluble thiocyanate, etc. A stabilizer solution contains, of course, a stabilizer such as formaldehyde, citric acid, etc. Specific examples of these compounds are illustrated on U.S. Pat. No. 3,582,322.

Other conventionally known water-soluble dyes as well as the dyes in accordance with the present invention can be incorporated in the emulsion layer and other hydrophilic colloid layer of a light sensitive material. It is advantageous to use two or more dyes in combination to provide the desired absorption characteristics. Illustrative dyes which can be used are, for example, oxonol dyes such as those described in British Pat. Nos. 1,373,026, 1,413,560, U.S. Pat. Nos. 3,247,127, 3,653,905, 2,533,472, 3,379,533, hemioxonol dyes such as those described in British Pat. No. 584,609, U.S. Pat. No. 3,687,670, U.S. Pat. No. 3,389,994 and the like.

An example in which a water soluble oxonol dye of the present invention is used for dyeing a photographic emulsion layer of a silver halide photographic sensitive material is shown in the following.

EXAMPLE 13

To a paper support coated with polyethylene, the following layers were applied in the order described to produce a sheet of a multilayer color printing paper.

Sample A (From the support)

Blue-Sensitive Emulsion Layer

A layer produced by applying a coating solution, which was produced by dispersing a yellow color coupler (*1) in a silver chlorobromide gelatin emulsion containing 80% by mol of silver bromide together with a solvent (*6) in an amount of ½ by weight based on the coupler, in a coating amount of 700mg/$m^2$ of the silver halide (corresponding to gelatin: 1500mg/$m^2$ and coupler: 500mg/$m^2$)

Intermediate Layer

A gelatin layer (1500mg/$m^2$) produced by dispersing a color stain inhibiting agent (*4) in gelatin together with a solvent (*7).

Green-Sensitive Emulsion Layer

A layer produced by applying a coating solution, which was prepared by dispersing a magenta color coupler (*2) in a silver chlorobromide gelatin emulsion containing 50% by mol of silver bromide spectrally sensitized by an oxacarbocyanine dye together with a solvent (*7) in an amount of ½ by weight based on the coupler, in a coating amount of 700mg/$m^2$ of the silver halide (corresponding to gelatin: 1500mg/$m^2$ and coupler: 400mg/$m^2$).

Ultraviolet Light Absorbing Layer

A layer produced by applying a gelatin dispersion which was produced by dispersing in gelatin a ultraviolet light absorbing agent (*5) in an amount of 120g per 100g of gelatin together with a solvent (*6) in a coating amount of 1200mg/$m^2$ of gelatin.

Red-Sensitive Emulsion Layer

A layer produced by applying a coating solution, which was prepared by dispersing a cyan coupler (*3) in an amount equal to the weight of the silver halide in a silver chlorobromide-gelatin emulsion containing 50% by mol of silver bromide spectrally sensitized with a thiadicarbocyanine dye together with a solvent (*6) in an amount of ½ by weight based on the coupler, in a coating amount of 500mg/$m^2$ of the silver halide (corresponding to gelatin: 1500mg/$m^2$ and coupler: 500mg/$m^2$).

Protective Layer

A gelatin layer: 1500mg/$m^2$.

(Note)

*1 α-Pivaloyl-α-[2,4-dioxo-5,5'-dimethyloxazolidine-3-yl]-2-chloro-5-[α-(2,4-di-t-amylphenoxy)butyramido]-acetoanilide.
*2 1-(2,4,6-Trichlorophenyl)-3-[2-chloro-5-tetradecanamido]-anilino-2-pyrazolin-5-one.
*3 2-[α-(2,4-Di-t-amylphenoxy)butyramido]-4,6-dichloro-5-methylphenol.
*4 2,4-Di-(1',1',3',3'-tetramethylbutyl)hydroquinone.
*5 2-(2-Hydroxy-3,5-dibutylphenyl)benzotriazole.
*6 Dibutylphthalate.
*7 Tricresylphosphate.

Sample B

The same procedure as used in Sample A was carried out except that Dye 8 of the present invention was added to the Red Sensitive Emulsion Layer in an amount of 50mg/m².

Sample C

The same procedure as used in Sample A was carried out except that comparison Dye (A) having the following formula was added to the Red-Sensitive Emulsion Layer in a coating amount of 20mg/m².

Dye (A)

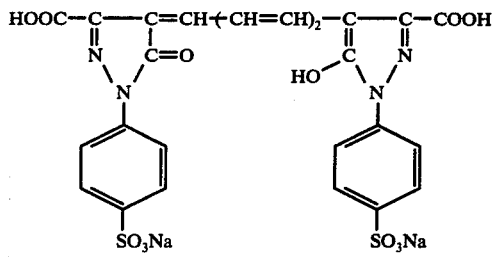

Each sample was exposed to red light through a Kodak Wratten Filter No. 29 and subjected to contact printing using a resolving power test chart in order to measure the image sharpness of the red-sensitive layer. Each sample was then subjected to the following color photographic processings.

| Color Development | 3 minutes and 30 seconds | 31° C |
|---|---|---|
| Bleach-Fixing | 1 minute and 30 seconds | " |
| Water Wash | 1 minute | " |
| Stabilization | 1 minute | " |
| Rinsing | few seconds | " |
| Drying | | |

The solution used in the above processing had the following compositions.

Composition of Color Developing Solution

| Benzyl Alcohol | 15ml |
|---|---|
| Sodium Sulfite (anhydrous) | 2g |
| Potassium Bromide | 0.5g |
| Hydroxylamine Sulfate | 2g |
| Potassium Carbonate (anhydrous) | 30g |
| Sodium Nitrilotriacetate | 2g |
| 4-Amino-3-methyl-N-ethyl-N-$\beta$-(methane-sulfonamide)ethylaniline | 5g |
| Water to make | 1 liter |
| | (pH 10.1) |

Composition of Bleach-Fixing Solution

| Ammonium Thiosulfate (70% aq. soln.) | 150ml |
|---|---|
| Sodium Sulfite | 5g |
| Ferric Sodium Ethylenediaminetetra-Acetate | 40g |
| Sodium Ethylenediaminetetraacetate | 4g |
| Water | 1 liter |
| | (pH: 6.7 – 7.0) |

Composition of Stabilizing Solution

| Sodium Benzoate | 0.5g |
|---|---|
| Citric Acid | 6.5g |
| Diethanolamine | 2.0g |
| Water to make | 1 liter |
| | (pH 3.5) |

On comparing the image sharpness of the samples which were processed so as to have the same printed density with each other by varying the exposure, the following results were obtained. The residual color of the dyes after processing is also shown below.

| Sample No. | Dye | Sharpness | Residual Color | | |
|---|---|---|---|---|---|
| | | | Cyan | Magenta | Yellow |
| A | Control | 2.8 | 0.08 | 0.09 | 0.08 |
| B | Dye 8 | 6.6 | 0.08 | 0.09 | 0.08 |
| C | (a) | 3.7 | 0.08 | 0.09 | 0.08 |

*Sharpness is the value of spatial frequency (lines/mm) at which the response becomes 0.3.
*Residual color is the value of density of each color component in the non-exposed area.

As can be understood from the results in the table above, image sharpness is highly improved by using the dyes according to the present invention. Further, the dyes are rapidly bleached in photographic processings and no residual color is observed.

While the invention has been described in detail and with reference to specific embodiments thereof, it will be apparent to one skilled in the art that various changes and modifications can be made therein without departing from the spirit and scope thereof.

What is claimed is:

1. A methine dye represented by the following general formula (A), (B) or (C):

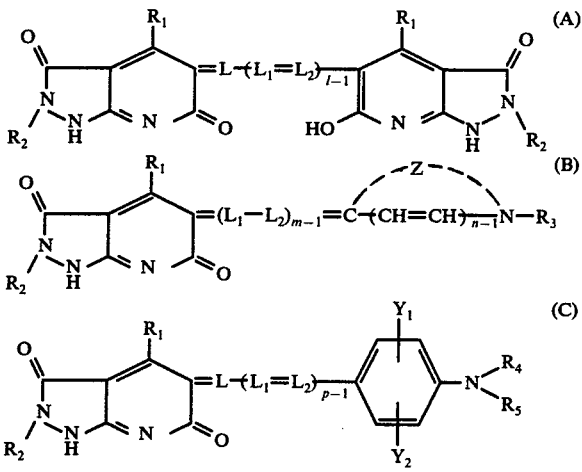

wherein $R_1$ represents an alkyl group, an aralkyl group, an aryl group, a 5- or 6-membered heterocyclic residue, a carboxyl group, an alkoxycarbonyl group, an aryloxycarbonyl group or an amino group; $R_2$, $R_3$, $R_4$ and $R_5$, which may be the same or different, each represents an alkyl group, an aralkyl group, an aryl group or a 5- or 6-membered heterocyclic residue; said 5- or 6-membered heterocyclic residue for $R_1$, $R_2$, $R_3$, $R_4$ and $R_5$ selected from the group consisting of a pyridyl group, a quinolinyl group, a benzoxazolyl group, a thiazolyl group, a benzothiazolyl group, an oxazolyl group or a selenazolyl group; and $R_2$ may additionally represent a hydrogen atom; Z represents an atomic group necessary to form a heterocyclic nucleus containing a 5- or 6- membered hetero ring, said ring selected from the group consisting of a thiazole ring, an oxazole ring, a selenazole ring, a pyridine ring, a quinoline ring or a tetrazole ring; $Y_1$ and $Y_2$, which may be the same or different, each represents a hydrogen atom, an alkyl group, a hydroxyl group, an alkoxy group, an amino group or a sulfo group; L, $L_1$ and $L_2$ each represents a methine group; $l$, $n$, and $p$ each represents 1 or 2; and $m$ represents 2 or 3.

2. The methine dye of claim 1, wherein said alkyl group for $R_1$ has 18 or less carbon atoms and is an alkyl group which may be unsubstituted or substituted with one or more of a sulfo group, a carboxyl group, a hydroxyl group, an alkoxy group, an alkoxycarbonyl group, a cyano group, a halogen atom, an acyl group, an acyloxy group or a vinyl group; said aralkyl group for $R_1$ is an aralkyl group having 7 to 10 carbon atoms in which the aryl moiety thereof may be unsubstituted or substituted with one or more of a sulfo group, a carboxyl group, an alkyl group, a hydroxyl group, an alkoxy group, a phenoxy group, a halogen atom, a nitro group or an amino group; said aryl group for $R_1$ is a monocyclic or bicyclic aryl group which may be unsubstituted or substituted with one or more of a sulfo group, a carboxyl group, an alkyl group, a hydroxyl group, an alkoxy group, a phenoxy group, a halogen atom, a nitro group or an amino group; said 5- or 6-membered heterocyclic residue for $R_1$ is a 4-pyridyl group, 2-pyridyl group, a 5-sulfo-2-pyridyl group, a 4-methyl-2-pyridyl group, a 2-quinolinyl group, a 4-quinolinyl group, a benzoxazolyl group, a 6-sulfobenzoxazolyl group, a 5-methylbenzoxazolyl group, a 4-methyl-5-ethoxycarbonylthiazolyl group, a 6-sulfobenzothiazolyl group, a 2-benzothiazolyl group or a 6-sulfo-7-methylbenzothiazolyl group; said alkoxycarbonyl group for $R_1$ is an alkoxycarbonyl group having 1 to 18 carbon atoms in the alkyl moiety thereof in which the alkyl moiety thereof may be unsubstituted or substituted with a methyl group, a sulfomethyl group, an ethoxycarbonylmethyl group, a β-chloroethyl group, a β-cyanoethyl group, an α-bromo-α-methyl ethyl group or a benzyl group; said aryloxycarbonyl group for $R_1$ is an aryloxycarbonyl group in which the aryl moiety thereof may be unsubstituted or may be a p-sulfoaryl moiety, an m,m-disulfoaryl moiety or an m-sulfoaryl moiety; and said amino group for $R_1$ is an unsubstituted amino group or a substituted amino group selected from the group consisting of an alkylamino group, an arylamino group, an acylamino group, a carbomoyl group and a ureido group;

wherein said alkyl group, said aralkyl group, said aryl group and said 5- or 6-membered heterocyclic residue for $R_2$, $R_3$, $R_4$ and $R_5$ is the same as said alkyl group, said aralkyl group, said aryl group and said 5- or 6-membered heterocyclic residue for $R_1$;

wherein said heterocyclic nucleus formed by Z is selected from the group consisting of thiazole, 4-methylthiazole, 5-methylthiazole, 4-phenylthiazole, 5-phenylthiazole, 4,5-diphenylthiazole, benzothiazole, 5-chlorobenzothiazole, 6-chlorobenzothiazole, 5-methylbenzothiazole, 6-methylbenzothiazole, 5-bromobenzothiazole, 5-methoxybenzothiazole, 5-hydroxybenzothiazole, α-naphthothiazole, β-naphthothiazole, 5-methoxy-β-naphthothiazole, 8-methoxy-α-naphthothiazole, 4-methyloxazole, 5-methyloxazole, 4-phenyloxazole, 5-phenyloxazole, 4,5-diphenyloxazole, 4-ethyloxazole, benzoxazole, 5-chlorobenzoxazole, 5-methylbenzoxazole, 5-phenylbenzoxazole, 5-methoxybenzoxazole, 5-ethoxycarbonylbenzoxazole, 5-cyanobenzoxazole, 5-trifluoromethylbenzoxazole, α-naphthoxazole, β-naphthoxazole, benzoselenazole, 5-chlorobenzoselenazole, 5-methylbenzoselenazole, 6-methoxybenzoselenazole, 2-pyridine, 5-methyl-2-pyridine, 4-pyridine, 2-quinoline, 6-methoxy-2-quinoline, 6-chloro-2-quinoline, 4-quinoline, 6-methoxy-4-quinoline, 7-methyl-4-quinoline, 1-isoquinoline, 3-isoquinoline or 5-tetrazole;

wherein said alkyl group for $Y_1$ and $Y_2$ is an unsubstituted alkyl group having 1 to 4 carbon atoms, said alkoxy group for $Y_1$ and $Y_2$ is an unsubstituted alkoxy group having 1 to 4 carbon atoms in the alkyl moiety thereof, and said amino group for $Y_1$ and $Y_2$ is an amino group which may be unsubstituted or a substituted amino group selected from the group consisting of a methyl amino group or an acetamido group;

and wherein said methine group for L, $L_1$ and $L_2$ is an unsubstituted methine group or a methine group substituted with a methyl group, a phenyl group or a chlorine atom.

3. The methine dye of claim 1, wherein L, $L_1$ and $L_2$ each represents an unsubstituted methine group.

4. The methine dye of claim 1, wherein $R_1$ represents an alkyl group, an aralkyl group, an aryl group, a carboxy group or an alkoxycarbonyl group.

5. The methine dye of claim 1, wherein said methine dye has the general formula (A).

6. The methine dye of claim 1, wherein said dye has the general formula (B), and said nucleus formed by Z is a thiazole nucleus, a benzothiazole nucleus, a naphthothiazole nucleus, an oxazole nucleus, a benzoxazole nucleus or a naphthoxazole nucleus.

7. The methine dye of claim 1, wherein said dye has the general formula (C) and $p$ is 1.

8. The methine dye of claim 4, wherein $R_2$ represents a hydrogen atom, an alkyl group, an aralkyl group or an aryl group.

9. The methine dye of claim 6, wherein $m$ is 2.

10. The methine dye of claim 8, wherein said dye has the general formula (B) and $R_3$ represents an alkyl group.

11. The methine dye of claim 8, wherein said dye has the general formula (C), and $R_4$ and $R_5$ each represents an alkyl group.

12. The methine dye of claim 11, wherein $Y_1$ and $Y_2$ each represents an alkyl group or an alkoxy group.

13. A process for synthesizing a methine dye represented by the formula (A)

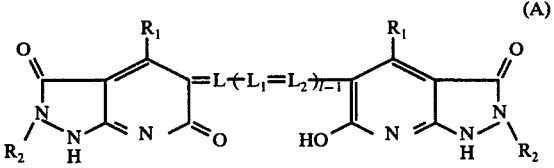

(A)

wherein $R_1$ represents an alkyl group, an aralkyl group, an aryl group, a 5- or 6-membered heterocyclic residue, a carboxyl group, an alkoxycarbonyl group, an aryloxycarbonyl group or an amino group; $R_2$ represents a hydrogen atom, an alkyl group, an aralkyl group, an aryl group or a 5- or 6-membered heterocyclic residue; said 5- or 6-membered heterocyclic residue for $R_1$ and R₂ is selected from the group consisting of a pyridyl group, a quinolinyl group, a benzoxazolyl group, a thiazolyl group, a benzothiazolyl group, an oxazolyl group or a selenazolyl group; L, L₁ and L₂ each represents a methine group; and *l* represents 1 or 2; which comprises reacting a compound represented by the formula (D)

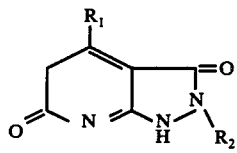
(D)

wherein R₁ and R₂ are as described above; with a compound represented by the formula (E), (F) or (G)

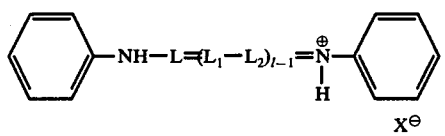
(E)

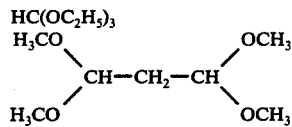
(F)
(G)

wherein L, L₁ and L₂ are as described above and X represents an acid anion.

14. A process for synthesizing a methine dye represented by the formula (B)

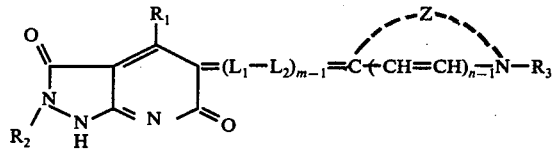
(B)

wherein R₁ represents an alkyl group, an aralkyl group, an aryl group, a 5- or 6-membered heterocyclic residue, a carboxyl group, an alkoxycarbonyl group, an aryloxycarbonyl group or an amino group; R₂ and R₃, which may be the same or different, each represents an alkyl group, an aralkyl group, an aryl group or a 5- or 6-membered heterocyclic residue; said 5- or 6-membered heterocyclic residue for R₁, R₂ and R₃ is selected from the group consisting of a pyridyl group, a quinolinyl group, a benzoxazolyl group, a thiazolyl group, a benzothiazolyl group, an oxazolyl group or a selenazolyl group; and R₂ may additionally represent a hydrogen atom; Z represents an atomic group necessary to form a heterocyclic nucleus containing a 5- or 6-membered heterocyclic ring, said ring selected from the group consisting of a thiazole ring, an oxazole ring, a selenazole ring, a pyridine ring, a quinoline ring or a tetrazole ring; L₁ and L₂ each represents a methine group; *n* represents 1 or 2; and *m* represent 2 or 3; which comprises reacting a compound represented by the formula (D)

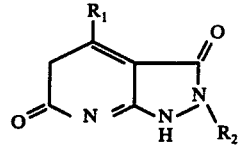
(D)

wherein R₁ and R₂ are as described above; with a compound of the formula (H)

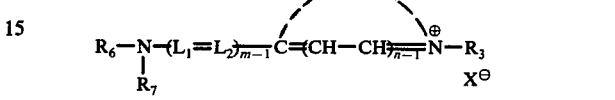
(H)

wherein R₆ represents an acyl group; R₇ represents an aryl group; X represents an acid anion; and R₃, L₁, L₂, X, *m* and *n* are as described above.

15. A process for synthesizing a methine dye represented by the formula (C)

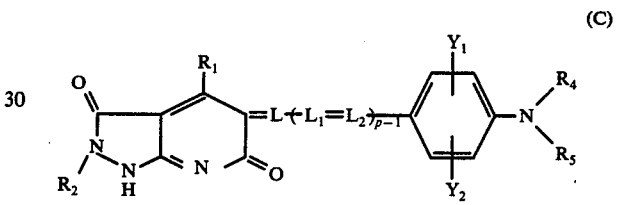
(C)

wherein R₁ represents an alkyl group, an aralkyl group, an aryl group, a 5- or 6-membered heterocyclic residue, a carboxyl group, an alkoxycarbonyl group, an aryloxycarbonyl group or an amino group; R₂, R₄ and R₅, which may be the same or different, each represents a hydrogen atom, an alkyl group, an aralkyl group, an aryl group or a 5- or 6-membered heterocyclic residue; said 5- or 6-membered heterocyclic residue for R₁, R₂, R₄ and R₅ is selected from the group consisting of a pyridyl group, a quinolinyl group, a benzoxazolyl group, a thiazolyl group, a benzothiazolyl group, an oxazolyl group or a selenazolyl group; Y₁ and Y₂, which may be the same or different, each represents a hydrogen atom, an alkyl group, a hydroxyl group, an alkoxy group, an amino group or a sulfo group; L, L₁ and L₂ each represents a methine group; and *p* represents 1 or 2;

which comprises reacting a compound of the formula (D)

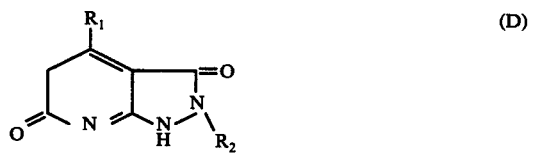
(D)

wherein R₁ and R₂ are as described above; with compound of the formula (J)

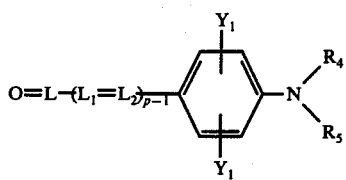 (J)
wherein $R_4$, $R_5$, L, $L_1$, $L_2$, $Y_1$, $Y_2$ and $p$ are as described above.
16. A silver halide photographic light sensitive material containing a methine dye of claim 1.
17. A silver halide photographic light sensitive material containing a dye represented by the formula
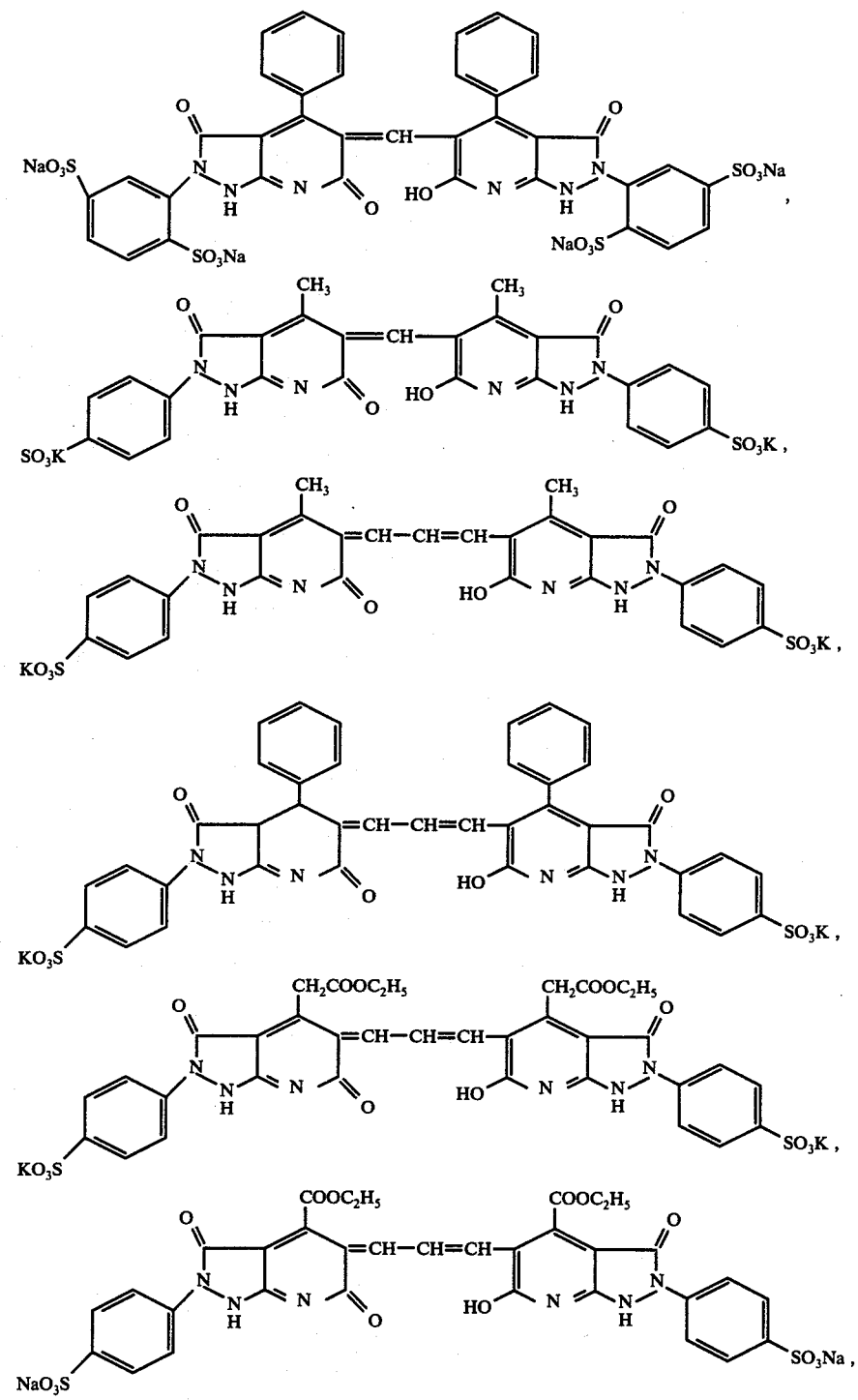

-continued

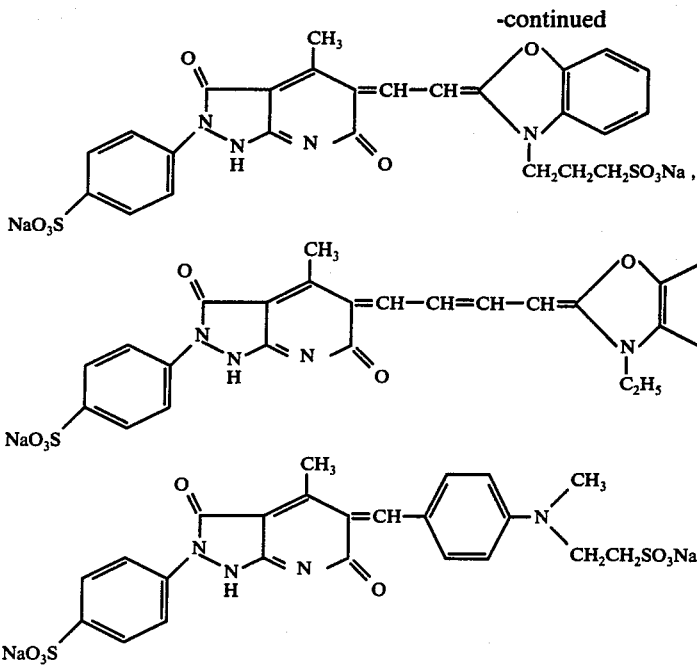

18. The process of claim 13, wherein said reacting is conducted at a temperature above about 100° C.

19. The process of claim 14, wherein said reacting is conducted at a temperature above about 100° C.

20. The process of claim 15, wherein said reacting is conducted at a temperature above about 70° C.

21. The process of claim 13, wherein said 5- or 6-membered heterocyclic residue for $R_1$ and $R_2$ is selected from the group consisting of a 4-pyridyl group, a 2-pyridyl group, a 5-sulfo-2-pyridyl group, a 4-methyl-2-pyridyl group, a 2-quinolinyl group, a 4-quinolinyl group, a benzoxazolyl group, a 6-sulfobenzoxazolyl group, a 5-methylbenzoxazolyl group, a 4-methyl-5-ethoxycarbonylthiazolyl group, a 6-sulfobenzothiazolyl group, a 2-benzothiazolyl group or a 6-sulfo-7-methylbenzothiazolyl group.

22. The process of claim 14, wherein said 5- or 6-membered heterocyclic residue for $R_1$, $R_2$ and $R_3$ is selected from the group consisting of 4-pyridyl group, 2-pyridyl group, a 5-sulfo-2-pyridyl group, a 4-methyl-2-pyridyl group, a 2-quinolinyl group, a 4-quinolinyl group, a benzoxazolyl group, a 6-sulfobenzoxazolyl group, a 5-methylbenzoxazolyl group, a 4-methyl-5-ethoxycarbonylthiazolyl group, a 6-sulfobenzothiazolyl group, a 2-benzothiazolyl group or a 6-sulfo-7-methylbenzothiazolyl group.

23. The process of claim 15, wherein said 5- or 6-membered heterocyclic residue for $R_1$, $R_2$, $R_4$ and $R_5$ is selected from the group consisting of a 4-pyridyl group, 2-pyridyl group, a 5-sulfo-2-pyridyl group, a 4-methyl-2-pyridyl group, a 2-quinolinyl group, a 4-quinolinyl group, a benzoxazolyl group, a 6-sulfobenzoxazolyl group, a 5-methylbenzoxazolyl group, a 4-methyl-5-ethoxycarbonylthiazolyl group, a 6-sulfobenzothiazolyl group, a 2-benzothiazolyl group or a 6-sulfo-7-methylbenzothiazolyl group.

24. The process of claim 14, wherein said heterocyclic nucleus is selected from the group consisting of thiazole, 4-methylthiazole, 5-methylthiazole, 4-phenylthiazole, 5-phenylthiazole, 4,5-diphenylthiazole, benzothiazole, 5-chlorobenzothiazole, 6-chlorobenzothiazole, 5-methylbenzothiazole, 6-methylbenzothiazole, 5-bromobenzothiazole, 5-methoxybenzothiazole, 5-hydroxybenzothiazole, α-naphthothiazole, β-naphthothiazole, 5-methoxy-β-naphthothiazole, 8-methoxy-α-naphthothiazole, 4-methyloxazole, 5-methyloxazole, 4-phenyloxazole, 5-phenyloxazole, 4,5-diphenyloxazole, 4-ethyloxazole, benzoxazole, 5-chlorobenzoxazole, 5-methylbenzoxazole, 5-phenylbenzoxazole, 5-methoxybenzoxazole, 5-ethoxycarbonylbenzoxazole, 5-cyanobenzoxazole, 5-trifluoromethylbenzoxazole, α-naphthoxazole, β-naphthoxazole, benzoselenazole, 5-chlorobenzoselenazole, 5-methylbenzoselenazole, 6-methoxybenzoselenazole, 2-pyridine, 5-methyl-2-pyridine, 4-pyridine, 2-quinoline, 6-methoxy-2-quinoline, 6-chloro-2-quinoline, 4-quinoline, 6-methoxy-4-quinoline, 7-methyl-4-quinoline, 1-isoquinoline, 3-isoquinoline or 5-tetrazole.

* * * * *